US012688151B2

(12) United States Patent
Fujikawa et al.

(10) Patent No.: US 12,688,151 B2
(45) Date of Patent: Jul. 21, 2026

(54) IMAGE FORMING APPARATUS AND DATA COMMUNICATION SYSTEM

(71) Applicant: KYOCERA Document Solutions Inc., Osaka (JP)

(72) Inventors: Takuma Fujikawa, Osaka (JP); Nobushiro Fujiwara, Osaka (JP); Shingo Ito, Kyoto (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/692,454

(22) PCT Filed: Sep. 16, 2022

(86) PCT No.: PCT/JP2022/034713
§ 371 (c)(1),
(2) Date: Mar. 15, 2024

(87) PCT Pub. No.: WO2023/042904
PCT Pub. Date: Mar. 23, 2023

(65) Prior Publication Data

US 2025/0123998 A1 Apr. 17, 2025

(30) Foreign Application Priority Data

Sep. 17, 2021 (JP) ................................. 2021-152572

(51) Int. Cl.
*G06F 16/13* (2019.01)
*H04N 1/00* (2006.01)

(52) U.S. Cl.
CPC ......... *G06F 16/13* (2019.01); *H04N 1/00411* (2013.01)

(58) Field of Classification Search
None
See application file for complete search history.

(56) References Cited

U.S. PATENT DOCUMENTS 6,722,800 B2 * 4/2004 Kimura .............. H04N 1/00188 400/70
8,126,904 B1 * 2/2012 Bettinger ............... G06Q 10/06 707/758
9,294,639 B2 * 3/2016 Yoshida ............... H04N 1/4406
9,513,860 B2 * 12/2016 Otake ................ H04N 1/00535
2002/0065111 A1 * 5/2002 Otsuka ...................... G06F 3/14 455/566

(Continued)

FOREIGN PATENT DOCUMENTS

JP 2006054777 A 2/2006
JP 2006094027 A 4/2006

(Continued)

*Primary Examiner* — Hasanul Mobin
(74) *Attorney, Agent, or Firm* — IP Business Solutions, LLC.

(57) ABSTRACT

An image forming apparatus includes a forming device forming an image on a sheet in accordance with print data, a communication device receiving first display data and second display data included in display data related to print data from a data management apparatus, and a display device displaying the display data. The display device separately displays the first display data and the second display data in separate screens.

5 Claims, 21 Drawing Sheets

(56) References Cited

U.S. PATENT DOCUMENTS

| | | | | |
|---|---|---|---|---|
| 2002/0135806 | A1* | 9/2002 | Yoshino | G06F 3/1284 358/1.15 |
| 2003/0002898 | A1* | 1/2003 | Kimura | H04N 1/00188 400/76 |
| 2008/0180703 | A1 | 7/2008 | Yamada | |
| 2009/0103138 | A1* | 4/2009 | Honda | G06F 15/16 358/1.18 |
| 2009/0135438 | A1* | 5/2009 | Chopra | H04N 1/00411 358/1.6 |
| 2011/0242599 | A1* | 10/2011 | Ohara | H04L 61/4541 358/1.15 |
| 2012/0129552 | A1* | 5/2012 | Skybey | G06Q 30/0613 455/456.3 |
| 2012/0327487 | A1* | 12/2012 | Kamisuwa | H04N 1/2338 358/527 |
| 2014/0218764 | A1 | 8/2014 | Murata | |
| 2014/0368410 | A1* | 12/2014 | Imai | G06F 3/1415 345/2.2 |
| 2015/0052467 | A1* | 2/2015 | Kim | H04N 1/00307 715/769 |
| 2019/0361634 | A1* | 11/2019 | Inoue | G06F 3/1204 |
| 2021/0185184 | A1* | 6/2021 | Kurase | H04N 23/60 |
| 2025/0123998 | A1* | 4/2025 | Fujikawa | G06F 3/1287 |

FOREIGN PATENT DOCUMENTS

| | | | |
|---|---|---|---|
| JP | 2007116267 | A | 5/2007 |
| JP | 2014225079 | A | 12/2014 |
| JP | 2019202502 | A | 11/2019 |

* cited by examiner

830

FOLDER A

FOLDER B

FOLDER C

832

FOLDER A     FILE A

FOLDER B     FILE B

FOLDER C

832

830

NUMBER OF SHEETS 1     DEADLINE 1/25

PAPER SIZE  A4     TOPIC NONE

KIND OF PAPER  PLAIN PAPER

LAYOUT  NONE

SETTING FOR DOUBLE-SIDED
        SINGLE-SIDED PRINTING

832

830

IMAGE FORMING APPARATUS AND DATA COMMUNICATION SYSTEM

TECHNICAL FIELD

The present invention relates to an image forming apparatus and a data communication system.

BACKGROUND ART

Servers are used for storing a large amount of data. It is being considered to allow a user to perform printing with a multi-function machine at an arbitrary place when necessary by uploading or downloading data with respect to a server (refer to Patent Literature 1).

Patent Literature 1 discloses an image inputting apparatus that prints image data under printing conditions according to image data and attribute information stored in a file management server. In the image inputting apparatus of Patent Literature 1, image data acquired through scanning and attribute information related to secondary use of the image data are uploaded on the file management server from a multi-function machine, and the file management server stores the image data and the attribute information. Further, when a multi-function machine or a personal computer on a network downloads image data from the file management server and prints the downloaded image data, image data is printed under printing conditions according to the attribute information of the image data (an output paper size, an output color mode, hidden printing, and the like).

CITATION LIST

Patent Literature

Patent Literature 1
Japanese Unexamined Patent Application Publication No. 2006-94027

SUMMARY OF INVENTION

In Patent Literature 1, an operation panel of an image forming apparatus is relatively large, but a display panel of the image forming apparatus may be relatively small. Particularly, printers for household use often have a relatively small display screen. For this reason, even if a server stores a large amount of display data related to print data, only a part of the display data can be displayed in a display screen of an image forming apparatus, and display of the remaining display data may be limited.

The present invention has been made in consideration of the foregoing problems, and an object thereof is to provide an image forming apparatus and a data communication system in which limitation of displaying display data related to print data can be curbed.

Solution to Problem

An image forming apparatus according to the present invention includes a forming device forming an image on a sheet in accordance with print data, a communication device receiving first display data and second display data included in display data related to print data from a data management apparatus, and a display device displaying the display data. The display device separately displays the first display data and the second display data in separate screens.

A data communication system according to the present invention includes an image forming apparatus forming an image on a sheet in accordance with print data, and an information processing terminal capable of communicating with the image forming apparatus. The information processing terminal has a communication device receiving first display data and second display data included in display data related to print data from a data management apparatus, and a display device displaying the display data. The display device separately displays the first display data and the second display data in separate screens.

Advantageous Effects of Invention

According to the present invention, it is possible to curb limitation of display according to display data related to print data.

DESCRIPTION OF EMBODIMENT

Hereinafter, an embodiment of an image forming apparatus and a data communication system according to the present invention will be described with reference to the drawings. In the diagrams, the same reference signs are applied to parts which are the same or corresponding, and description will not be repeated.

Figure 1:
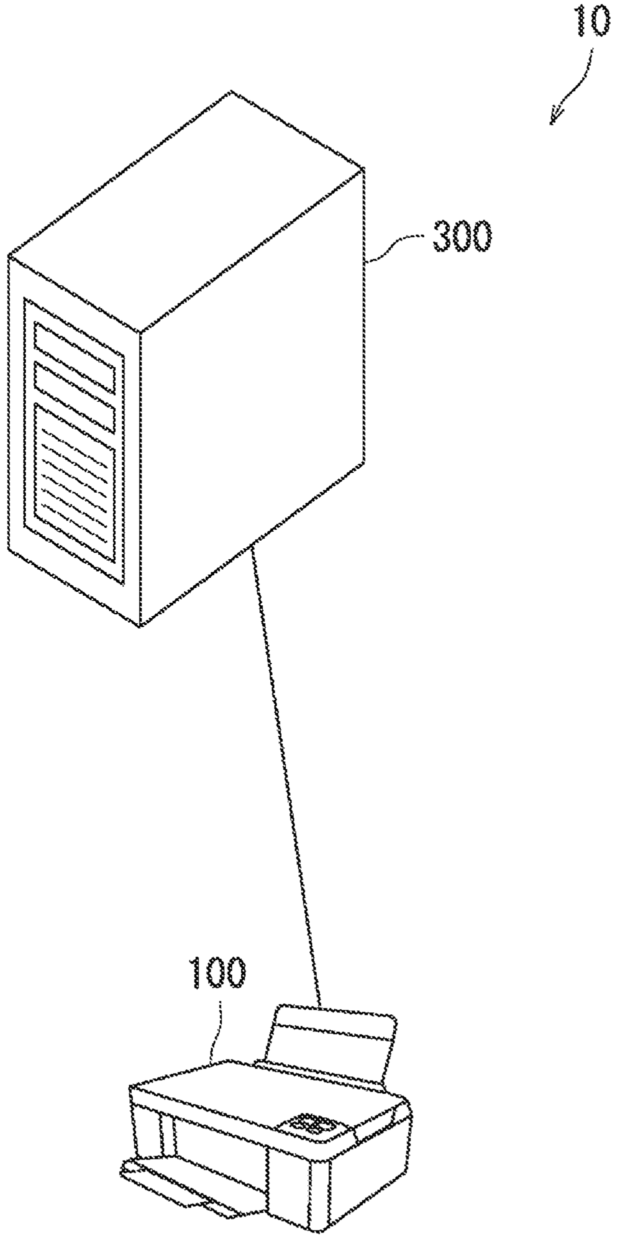
FIG. 1 is a schematic view of a data communication system including an image forming apparatus of the present embodiment.

First, with reference to FIG. 1, a constitution of a data communication system 10 including image forming apparatuses 100 of the present embodiment will be described. FIG. 1 is a schematic view of the data communication system 10 including the image forming apparatuses 100. In the present embodiment, the data communication system 10 includes the image forming apparatus 100. The image forming apparatus 100 communicates with a data management apparatus 300. The data communication system 10 may include the data management apparatus 300.

The image forming apparatus 100 forms an image on a sheet. In the present embodiment, for example, the image forming apparatus 100 is a printer, a copying machine, or a multi-function machine. The image forming apparatus 100 may have a function of a facsimile. Here, the image forming apparatus 100 is an inkjet type. The image forming apparatus 100 may be an electrophotographic type.

In the data communication system 10, the image forming apparatus 100 and the data management apparatus 300 are connected to each other via a network. For example, the image forming apparatus 100 and the data management apparatus 300 are connected to each other via the Internet, a local area network (LAN), or a wide area network (WAN) such that communication can be performed therebetween.

The data management apparatus 300 manages data. For example, the data management apparatus 300 manages print data and display data related to the print data. The data management apparatus 300 is a so-called server. The data management apparatus 300 may be a cloud server.

The data management apparatus 300 transmits print data to the image forming apparatus 100 in response to a request from the image forming apparatus 100. In addition, the data management apparatus 300 transmits display data to the image forming apparatus 100 before or after print data is transmitted to the image forming apparatus 100 or together with print data.

The image forming apparatus 100 forms an image on a sheet in accordance with print data. The image forming apparatus 100 displays display data related to print data before or at the same time as an image is formed on a sheet. The image forming apparatus 100 may display display data related to print data after an image is formed on a sheet in accordance with print data. The image forming apparatus 100 may transmit data to the data management apparatus 300, and the data management apparatus 300 may manage data received from the image forming apparatus 100.

Figure 2:
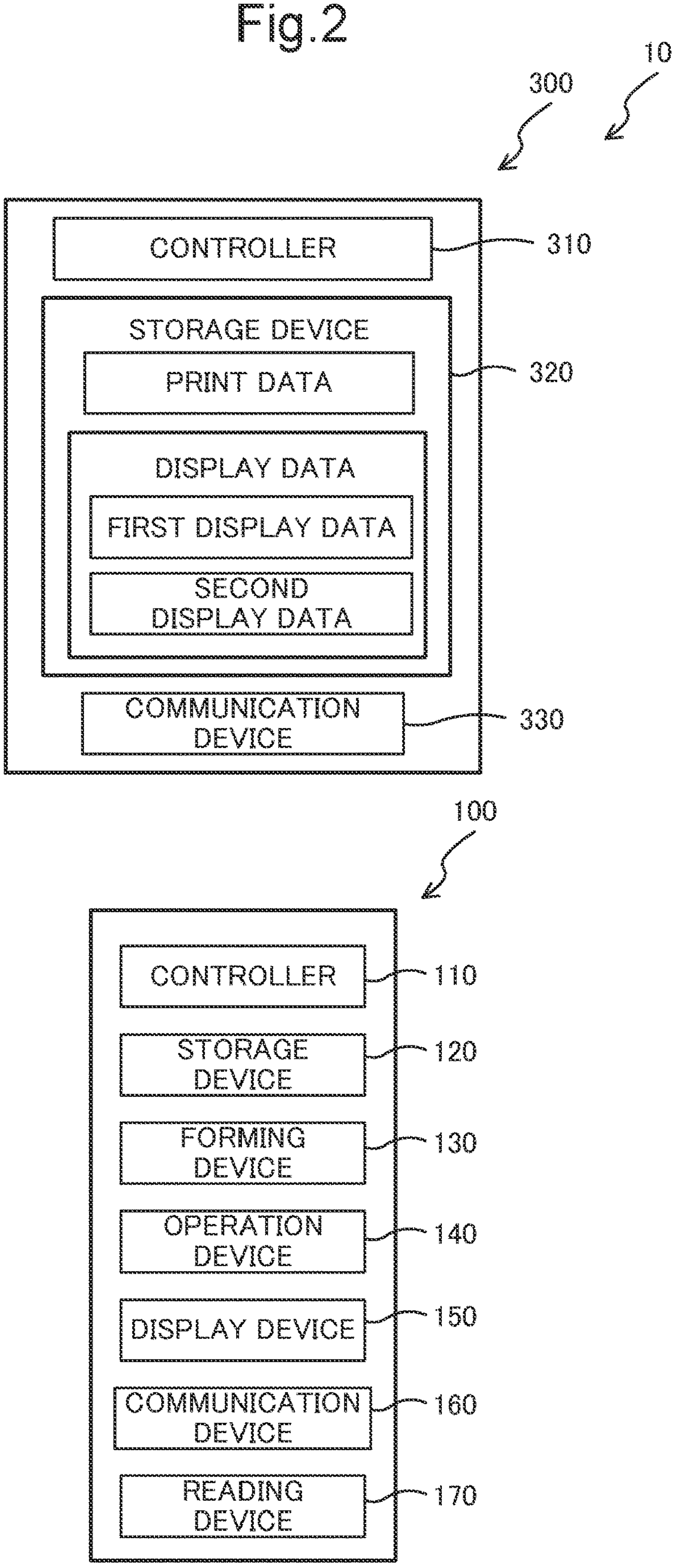
FIG. 2 is a block diagram of the data communication system including the image forming apparatus of the present embodiment.

Next, with reference to FIGS. 1 and 2, a constitution of the data communication system 10 will be described. FIG. 2 is a block diagram of the data communication system 10.

As shown in FIG. 2, the data communication system 10 includes the image forming apparatus 100. The image forming apparatus 100 communicates with the data management apparatus 300.

The image forming apparatus 100 has a controller 110, a storage device 120, a forming device 130, an operation device 140, a display device 150, and a communication device 160. The controller 110 controls the storage device 120, the forming device 130, the operation device 140, the display device 150, and the communication device 160.

The controller 110 includes a computing element. The computing element includes a processor. As an example, the processor includes a central processing unit (CPU).

The storage device 120 stores data and computer programs. The storage device 120 includes a storage element. The storage device 120 includes a main storage element such as a semiconductor memory, and an auxiliary storage element such as a semiconductor memory and/or a hard disk drive. The storage device 120 may include a removable medium. The processor of the controller 110 controls the constituents of the image forming apparatus 100 by executing the computer program stored in the storage element of the storage device 120.

For example, the computer program is stored in a non-transitory computer readable storage medium. Examples of the non-transitory computer readable storage medium include a read only memory (ROM), a random access memory (RAM), a CD-ROM, a magnetic tape, a magnetic disk, and an optical data storage apparatus.

The forming device 130 forms an image on a sheet in accordance with print data. Alternatively, the forming device 130 may form an image on a sheet using a toner. For example, the sheet is plain paper, recycled paper, thin paper, cardboard, or coated paper. For example, the forming device 130 is an inkjet-type image forming mechanism including an inkjet head or is an electrophotographic-type image forming mechanism including a photoreceptor drum, an electrification apparatus, an exposure apparatus, a developing apparatus, a transfer apparatus, an anchoring apparatus, and the like.

The operation device 140 receives an operation of an operator. If the operation device 140 receives an operation of the operator, the controller 110 controls the storage device 120, the forming device 130, the display device 150, and the communication device 160 in accordance with details of an operation.

The operation device 140 includes buttons or a keyboard. Alternatively, the operation device 140 may include a touch sensor.

The display device 150 displays an operation screen or results of various kinds of processing. The display device 150 includes a liquid crystal display (LCD), an organic electro-luminescence (EL) display, or a plasma display. The operation device 140 and the display device 150 may be integrated together in a touch panel.

The display device 150 may display an image in accordance with print data. In this case, the operator can visually recognize print data before the forming device 130 forms an image on a sheet. In addition, the display device 150 displays an image in accordance with display data related to print data.

For example, the communication device 160 includes a network interface and communicates with external equipment. For example, the communication device 160 communicates with the data management apparatus 300. The communication device 160 receives print data from the data management apparatus 300. In addition, the communication device 160 receives display data from the data management apparatus 300. The communication device 160 may transmit data to the data management apparatus 300.

The image forming apparatus 100 may further have a reading device 170. The reading device 170 is a scanner including a contact image sensor (CIS), a charge coupled device (CCD), and the like. The reading device 170 generates scan data by reading a sheet. The storage device 120 stores scan data generated by the reading device 170 reading paper. For example, the communication device 160 may transmit scan data to the data management apparatus 300.

The data management apparatus 300 stores print data and display data related to the print data. Display data has first display data and second display data.

The data management apparatus 300 has a controller 310, a storage device 320, and a communication device 330. The controller 310 includes a computing element. The computing element includes a processor. As an example, the processor includes a central processing unit (CPU). The processor may include an application specific integrated circuit (ASIC).

The storage device 320 stores various kinds of data. For example, the storage device 320 stores a control program. The controller 310 controls computation of the data management apparatus 300 by executing the control program. Specifically, the processor of the controller 310 controls the constituents of the data management apparatus 300 by executing the computer program stored in the storage element of the storage device 320.

For example, the computer program is stored in a non-transitory computer readable storage medium. Examples of the non-transitory computer readable storage medium include a read only memory (ROM), a random access memory (RAM), a CD-ROM, a magnetic tape, a magnetic disk, and an optical data storage apparatus.

The storage device 320 stores print data. The storage device 320 includes a main storage element such as a semiconductor memory, and an auxiliary storage element such as a semiconductor memory and/or a hard disk drive. The image forming apparatus 100 forms an image on a sheet in accordance with print data.

The storage device 320 also stores display data. Display data indicates data related to print data. Display data is stored in association with print data.

The display data includes the first display data and the second display data. For example, the first display data indicates printing conditions for print data. Examples of printing conditions include the number of printing sheets, the paper size at the time of printing, printing setting conditions (single-sided printing, double-sided printing), necessity of layout change, and the magnification.

The second display data indicates a print data deadline or precautions related to print data. The print data deadline includes a deadline for printing print data and a deadline for requesting an answer to print data. Caution information includes matters that an operator should pay attention to related to print data. For example, the caution information may be matters that an operator should pay attention to when printed matter is scanned or uploaded after print data is printed.

For example, the communication device 330 includes a network interface and communicates with external equipment. Here, the communication device 330 receives a particular signal from at least the image forming apparatus 100 and transmits a particular signal to the image forming apparatus 100.

Figure 3A:
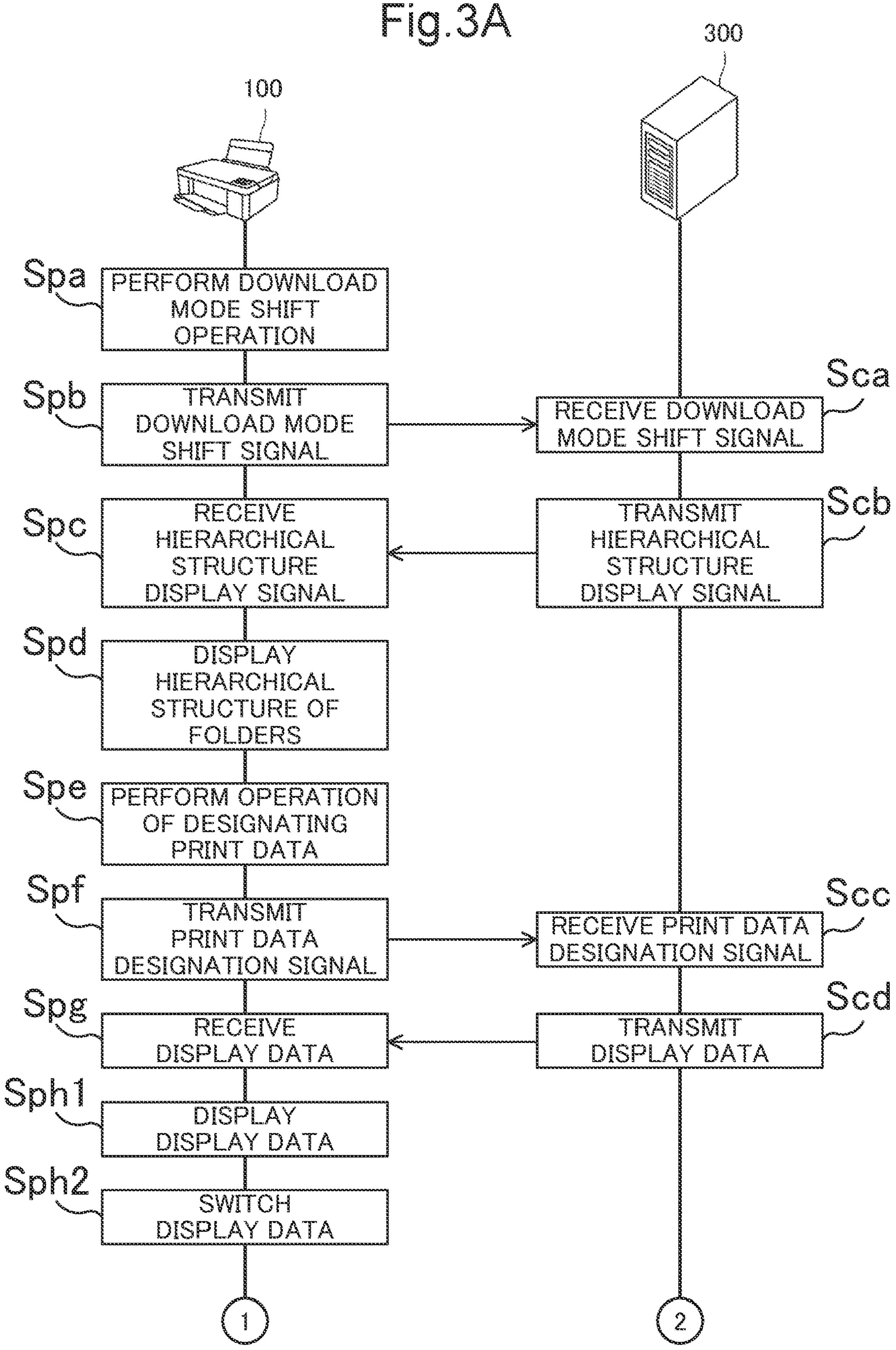
FIG. 3A is an explanatory flowchart of printing of print data in the data communication system of the present embodiment.
Figure 3B:
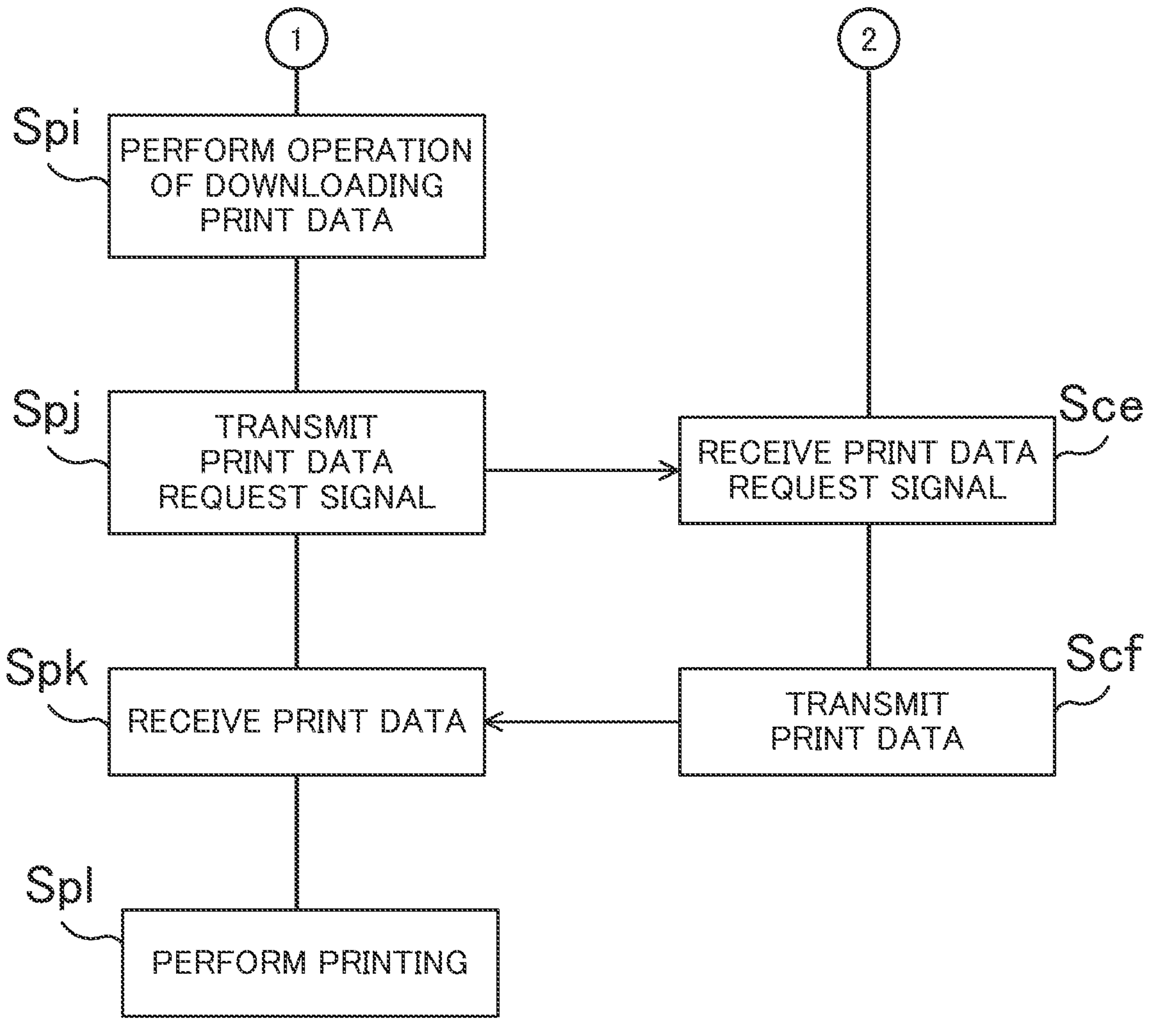
FIG. 3B is an explanatory flowchart of printing of print data in the data communication system of the present embodiment.

Next, with reference to FIGS. 1 to 3B, printing of print data in the image forming apparatus 100 will be described. FIGS. 3A and 3B are flowcharts showing downloading of print data in the image forming apparatus 100.

As shown in FIG. 3A, in Step Spa, the image forming apparatus 100 receives a download mode shift operation. Typically, if the operation device 140 receives a download mode shift operation of the operator, the controller 110 shifts to a download mode.

In Step Spb, the image forming apparatus 100 transmits a download mode shift signal indicating a shift to the download mode to the data management apparatus 300. Specifically, the communication device 160 transmits a download mode shift signal to the data management apparatus 300.

In Step Sca, the data management apparatus 300 receives a download mode shift signal from the image forming apparatus 100. Specifically, the communication device 330 receives a download mode shift signal from the image forming apparatus 100.

In Step Scb, the data management apparatus 300 transmits a hierarchical structure display signal (hierarchical structure information) to the image forming apparatus 100. Specifically, the communication device 330 transmits a hierarchical structure display signal to the image forming apparatus 100.

In Step Spc, the image forming apparatus 100 receives a hierarchical structure display signal from the data management apparatus 300. Specifically, the communication device 160 receives a hierarchical structure display signal from the data management apparatus 300.

In Step Spd, the image forming apparatus 100 displays a hierarchical structure of folders in the storage device 320 in accordance with a hierarchical structure display signal. Specifically, the display device 150 displays the hierarchical structure of folders of the data management apparatus 300 in accordance with a hierarchical structure display signal. Typically, if the operation device 140 receives an operation of the operator, the display device 150 displays the hierarchical structure of folders of the data management apparatus 300.

In Step Spe, the image forming apparatus 100 receives an operation of designating print data stored in the hierarchical structure of folders in the storage device 320. Typically, in a state in which the display device 150 displays at least one piece of print data stored in the data management apparatus 300, the operation device 140 receives an operation of designating print data from a particular folder of the hierarchical structure of folders.

In Step Spf, the image forming apparatus 100 transmits a print data designation signal to the data management apparatus 300. Specifically, the communication device 160 transmits a print data designation signal to the data management apparatus 300.

In Step Scc, the data management apparatus 300 receives a print data designation signal from the image forming apparatus 100. Specifically, the communication device 330 receives a print data designation signal from the image forming apparatus 100.

In Step Scd, the data management apparatus 300 transmits display data corresponding to print data designated by a print data designation signal to the image forming apparatus 100. Specifically, the controller 310 identifies print data designated in a print data designation signal from a folder of the storage device 320 and reads display data related to the identified print data. The communication device 330 transmits display data related to print data to the image forming apparatus 100.

In Step Spg, display data related to print data designated in a print data designation signal is received. The communication device 160 receives display data related to print data selected in Step Spe from the data management apparatus 300. For example, if selection of print data is performed in the operation device 140, the communication device 160 receives display data related to print data.

In Step Sph1, display data is displayed. Specifically, when the communication device 160 receives display data, the display device 150 displays a part of the display data included in the display data. For example, the display device 150 displays the first display data.

In Step Sph2, display data is switched and displayed. The display device 150 displays the second display data in place of the first display data. Specifically, in Step Sph2, the display device 150 displays display data different from the display data displayed in Step Sph1. For example, when the display device 150 displays the first display data in Step Sph1, the display device 150 displays the second display data in Step Sph2. Typically, if the first display data is selected in the operation device 140, the display device 150 displays the second display data which has changed from the first display data.

As shown in FIG. 3B, in Step Spi, the image forming apparatus 100 receives an operation of downloading print data. Typically, in a state in which the display device 150 has displayed at least display data, the operation device 140 receives an operation of downloading print data.

In Step Spj, the image forming apparatus 100 transmits a print data request signal for requesting downloading of print data to the data management apparatus 300. Specifically, the communication device 160 transmits a print data request signal to the data management apparatus 300.

In Step Sce, the data management apparatus 300 receives a print data request signal from the image forming apparatus 100. Specifically, the communication device 330 receives a print data request signal from the image forming apparatus 100.

In Step Scf, the data management apparatus 300 transmits print data designated in a print data designation signal to the image forming apparatus 100 in response to a print data request signal. Specifically, the communication device 330 transmits print data to the image forming apparatus 100.

In Step Spk, the image forming apparatus 100 receives print data from the data management apparatus 300. Specifically, the communication device 160 receives print data from the data management apparatus 300.

In Step Spl, the image forming apparatus 100 forms an image on a sheet in accordance with print data. Specifically, the forming device 130 forms an image on a sheet in accordance with print data.

In the image forming apparatus 100 of the present embodiment, display data related to print data is separately displayed into the first display data and the second display data. Therefore, regardless of a display screen of the display device 150, limitation of display according to display data related to print data can be curbed. That is, even if the display screen of the display device 150 is a small screen in which display data cannot be displayed at once, limitation of displaying display data related to print data can be avoided.

Typically, since the display screen of the display device 150 is relatively small, in the image forming apparatus 100 of the present embodiment, the display device 150 displays the first display data and the second display data of display data in separate screens. For example, the display device 150 displays the first display data in the display screen and displays "a forward button" for a change to another display screen displaying the second display data. If the operator operates "the forward button", the display device 150 displays the second display data in the display screen. When the display device 150 displays the second display data in the display screen, it is preferable to display "a return button" for returning to the original display screen displaying the first display data. In addition, display data other than the first display data and the second display data may be displayed in the display device 150 of the image forming apparatus 100 by the operator operating the operation device 140.

Next, with reference to FIGS. 1 to 4, printing of print data in the image forming apparatus 100 will be described. FIGS. 4A to 4D are schematic views of the display device 150 when print data is downloaded in the image forming apparatus 100.

Figure 4A:
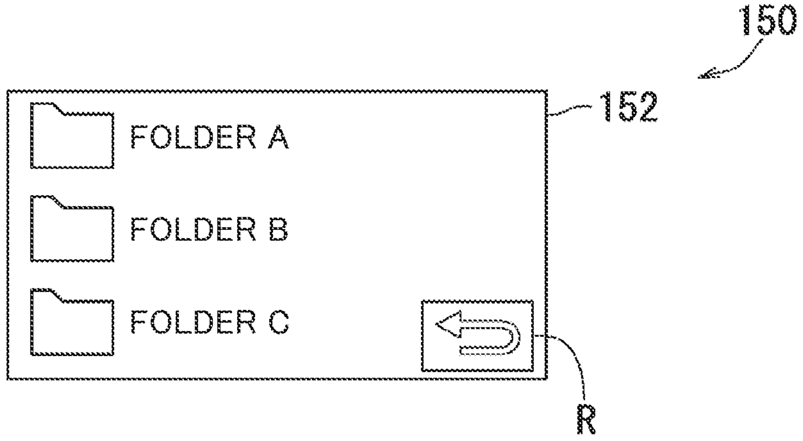
FIGS. 4A to 4D are schematic views showing change in a display screen when print data is printed in the image forming apparatus of the present embodiment.

As shown in FIG. 4A, in the image forming apparatus 100, the display device 150 has a display screen 152. The display device 150 displays the hierarchical structure of folders of the storage device 320 in accordance with a hierarchical structure display signal. In addition, the display device 150 displays a return button R for returning the display screen 152 to an immediately previous screen. The return button R is located at the lower right in the display screen 152.

The display device 150 displays the hierarchical structure of folders in accordance with a hierarchical structure display signal. Here, regarding folders, a folder A, a folder B, and a folder C are managed in the same level. The operator can select the folder A, the folder B, and the folder C using the operation device 140.

Figure 4B:
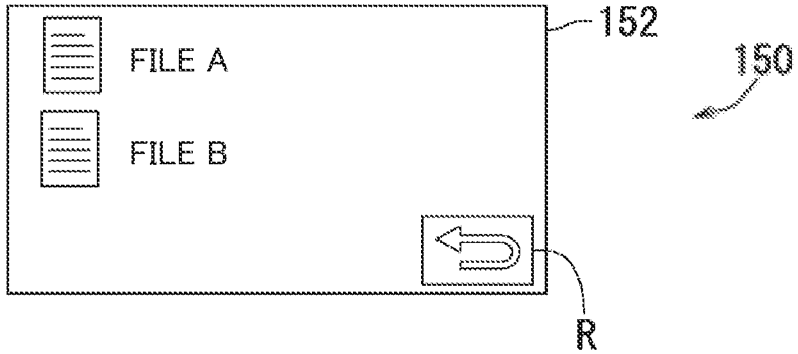

As shown in FIG. 4B, if the operation device 140 receives an operation of the operator selecting a folder, the display device 150 displays a file or a folder inside the selected folder. For example, while the display device 150 displays the hierarchical structure of folders, if the operation device 140 receives an operation of the operator selecting the folder A, the display device 150 displays a file A and a file B included in the selected folder A. The operation device 140 receives an operation of the operator selecting the file A and the file B.

As described above, if the file A and the file B are selected, the communication device 160 transmits a print data designation signal for designating the selected files to the data management apparatus 300. Thereafter, the communication device 160 receives display data related to the selected files from the data management apparatus 300. The display device 150 performs display in accordance with the display data.

Figure 4C:
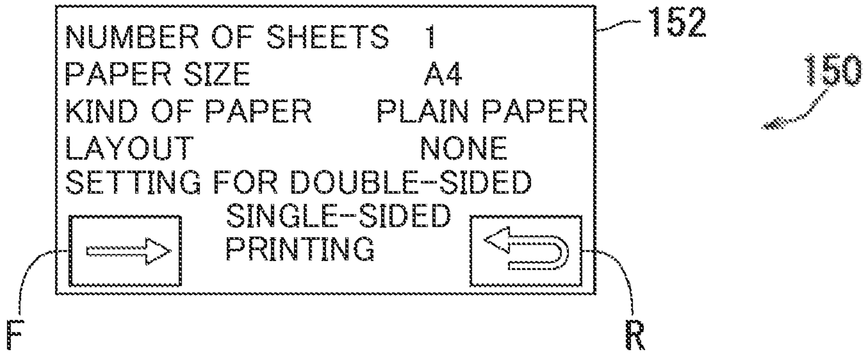

If the operation device 140 receives an operation of the operator selecting a file and transmits a print data designation signal to the data management apparatus 300, and if the communication device 160 receives the foregoing display data from the data management apparatus 300, as shown in FIG. 4C, the display device 150 displays the first display data related to the file in accordance with the display data. Here, the first display data indicates printing conditions. The display device 150 displays printing conditions in accordance with the first display data. Printing conditions include the number of printing sheets, the paper size at the time of printing, the kind of paper, necessity of layout change, and printing setting conditions (single-sided printing, double-sided printing).

The return button R is located at the lower right in the display screen 152. The return button R is a button for returning to a previous display screen. If the return button R is operated, the display screen changes to the previous display screen.

A forward button F is located at the lower left in the display screen 152. The forward button F is a button for proceeding to a next display screen. If the forward button F is operated, the display screen changes to the next display screen.

Figure 4D:
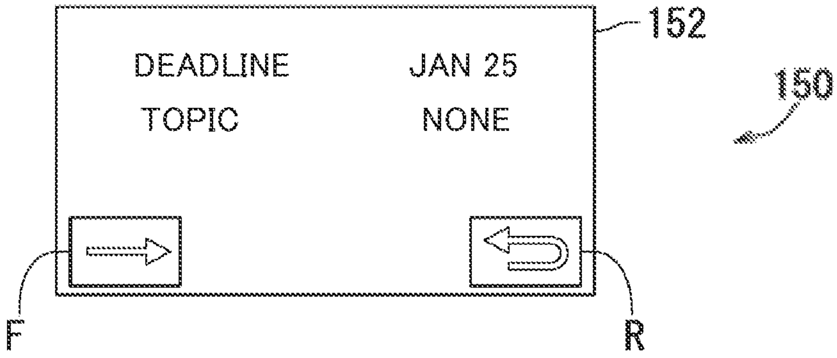

If the forward button F is operated, as shown in FIG. 4D, the display device 150 displays the second display data as a next display screen. The display device 150 displays a deadline related to print data.

The forward button F is located at the lower left in the display screen 152. The forward button F is a button for proceeding to a next display screen. If the forward button F is operated, the display screen changes to the next display screen.

The return button R is located at the lower right in the display screen 152. In this case, the return button R is a button for returning to a previous display screen. If the return button R is operated, the display screen changes to the previous display screen.

In this manner, in the image forming apparatus 100 of the present embodiment, the first display data and the second display data can be displayed in the display screen 152 in a switchable manner by means of an operation of the forward button or the return button. For this reason, even if the display screen 152 of the display device 150 is relatively small, the display device 150 can display a sizable amount of display data.

When the display screen is relatively large, it is preferable that a plurality of pieces of data included in display data be displayed in one display screen.

Figure 5:
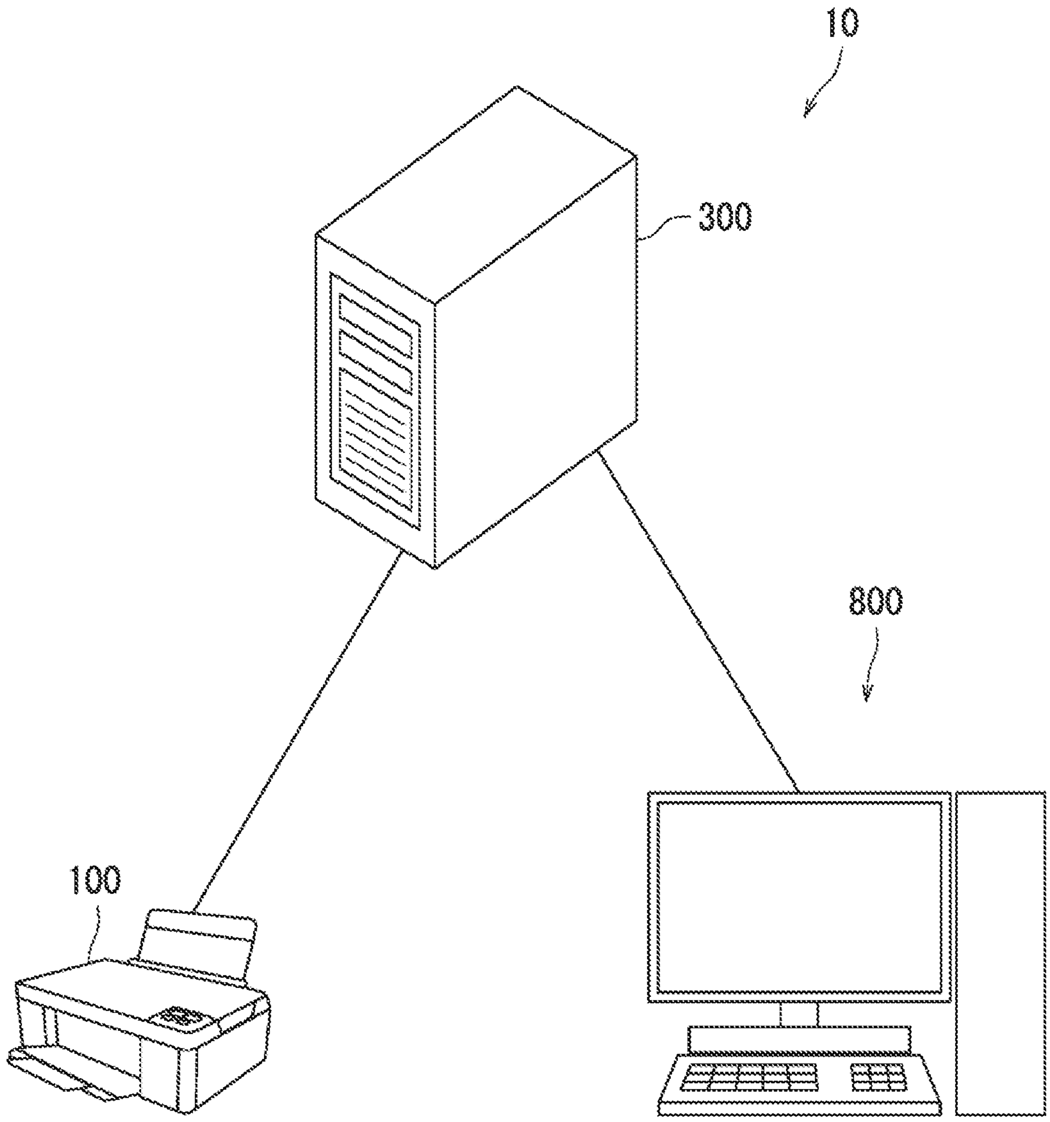
FIG. 5 is a schematic view of the data communication system including the image forming apparatus of the present embodiment.

Next, with reference to FIGS. 5 to 8, a constitution of the data communication system 10 including the image forming apparatus 100 and an information processing apparatus 800 will be described. FIG. 5 is a schematic view of the data communication system 10 including the image forming apparatus 100. The information processing apparatus 800 has a display screen relatively larger than the display device 150 of the image forming apparatus 100.

In the present embodiment, the data communication system 10 includes the image forming apparatus 100 and the information processing apparatus 800. The image forming apparatus 100 communicates with the data management apparatus 300. The information processing apparatus 800 communicates with the image forming apparatus 100 and/or the data management apparatus 300. The data communication system 10 may include the data management apparatus 300 in addition to the image forming apparatus 100 and the information processing apparatus 800.

An application program which operates in association with the image forming apparatus 100 may be installed in the information processing apparatus 800. For example, a general-purpose information processing apparatus, in which an application program that operates in association with the image forming apparatus 100 is installed, can be used as the information processing apparatus 800. For example, when an application program is installed in an information processing apparatus from the data management apparatus 300, the information processing apparatus functions as the information processing apparatus 800.

The information processing apparatus 800 has a display screen larger than the display device of the image forming apparatus 100. The information processing apparatus 800 is a so-called personal computer.

The information processing apparatus 800 operates in association with the image forming apparatus 100. The information processing apparatus 800 receives display data related to print data for forming an image on a sheet in the image forming apparatus 100 from the data management apparatus 300. The information processing apparatus 800 receives display data stored in the data management apparatus 300 directly or indirectly from the data management apparatus 300 and displays the display data.

As described above, the image forming apparatus 100 displays the first display data and the second display data included in display data in separate screens within the display screen. On the other hand, the information processing apparatus 800 displays the first display data and the second display data included in display data at the same time within the same display screen.

In the data communication system 10, the image forming apparatus 100 and the data management apparatus 300 are connected to each other via a network. For example, the image forming apparatus 100 and the data management apparatus 300 are connected to each other via the Internet, a local area network (LAN), or a wide area network (WAN) such that communication can be performed therebetween.

The data management apparatus 300 may transmit data to the information processing apparatus 800. In addition, the data management apparatus 300 may manage data received from the information processing apparatus 800.

Figure 6:
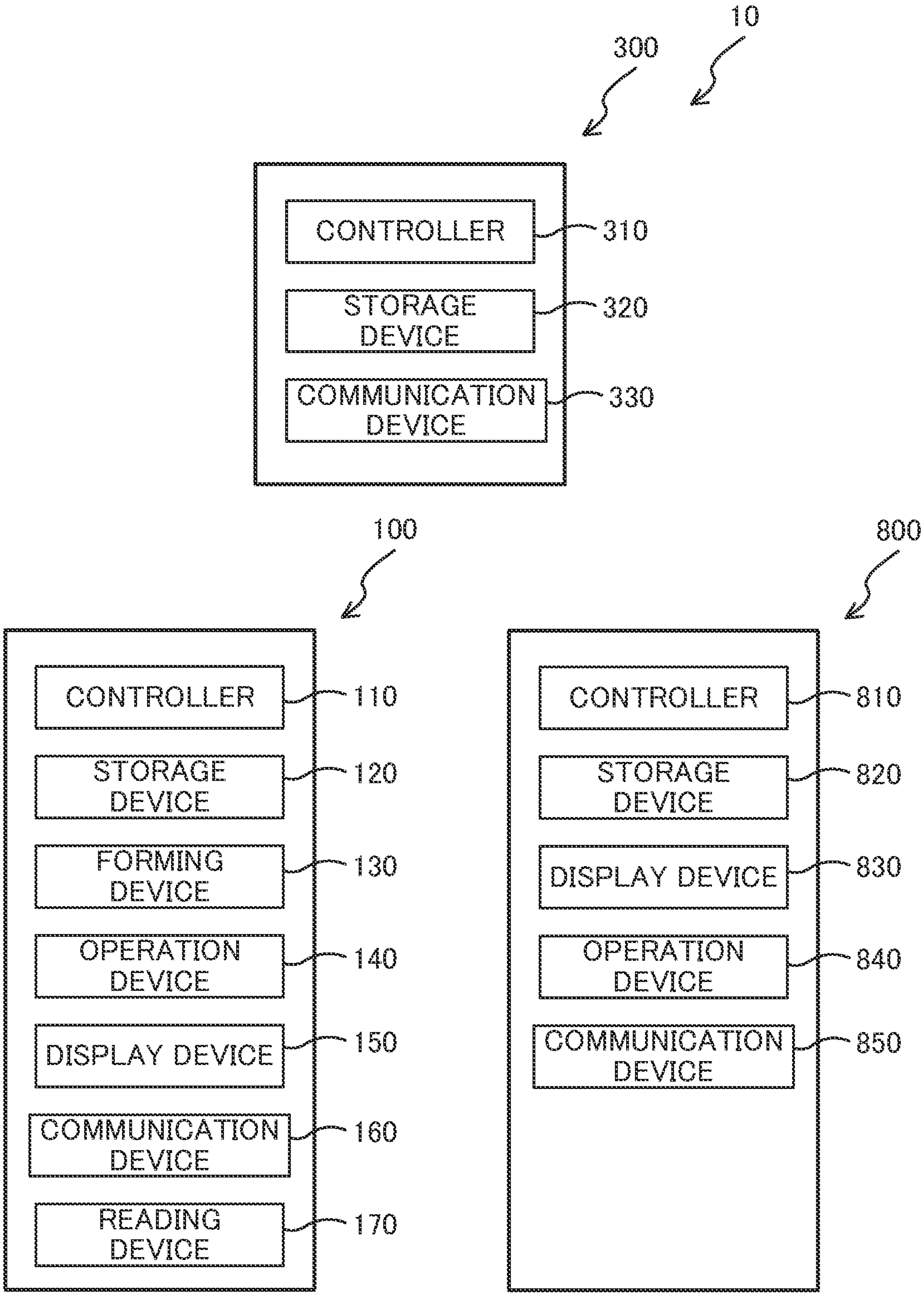
FIG. 6 is a block diagram of the data communication system including the image forming apparatus of the present embodiment.

Next, with reference to FIGS. 5 and 6, a constitution of the data communication system 10 will be described. FIG. 6 is a block diagram of the data communication system 10.

As shown in FIG. 6, the data communication system 10 includes the image forming apparatus 100 and the information processing apparatus 800. The data communication system 10 may include the data management apparatus 300 in addition to the image forming apparatus 100 and the information processing apparatus 800.

The information processing apparatus 800 has a controller 810, a storage device 820, a display device 830, an operation device 840, and a communication device 850. The controller 810 controls the storage device 820, the display device 830, the operation device 840, and the communication device 850.

The controller 810 includes a computing element. The computing element includes a processor. As an example, the processor includes a central processing unit (CPU). The processor may include an application specific integrated circuit (ASIC).

The storage device 820 stores various kinds of data. For example, the storage device 820 includes a main storage element such as a semiconductor memory, and an auxiliary storage element such as a semiconductor memory and/or a hard disk drive. For example, the storage device 820 stores a control program for driving the information processing apparatus 800. The controller 810 controls operation of the information processing apparatus 800 by executing the control program. Specifically, the processor of the controller 810 controls the constituents of the information processing apparatus 800 by executing the computer program stored in the storage element of the storage device 820.

The display device 830 displays an operation screen or results of various kinds of processing. The display device 830 includes a liquid crystal display or an organic EL display.

The operation device 840 may include a touch sensor. The display device 830 and the operation device 840 may be integrated together in a touch panel. For example, the touch panel displays various keys for instructing the kind of job and the details of job. Alternatively, the operation device 840 may include buttons or a keyboard. The operation device 840 outputs a signal indicating an instruction corresponding to operation of the buttons, the keyboard, or the touch panel to the controller 810 or the like.

For example, the communication device 850 includes a network interface and communicates with external equipment. Here, the communication device 850 transmits a particular signal to at least the image forming apparatus 100. In addition, the communication device 850 may receive a particular signal from at least the image forming apparatus 100. Alternatively, the communication device 850 may be able to communicate with the data management apparatus 300.

Figure 7A:
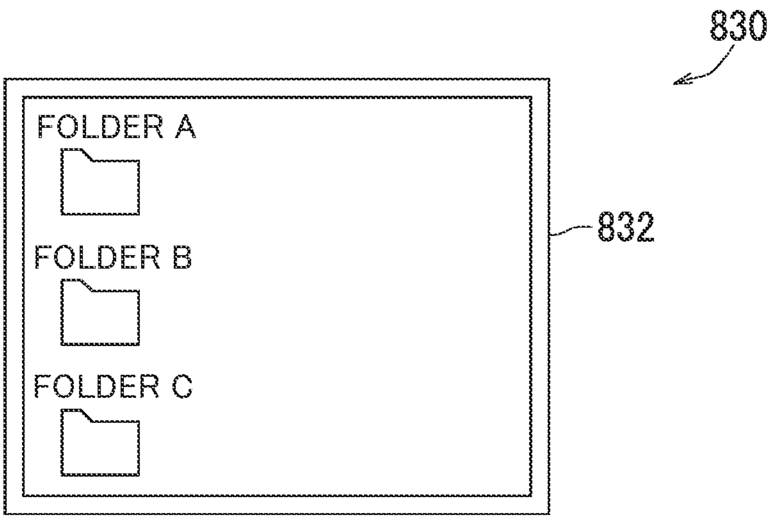
FIGS. 7A to 7C are schematic views showing change in a display screen when print data is printed in the image forming apparatus of the present embodiment.
Figure 7B:
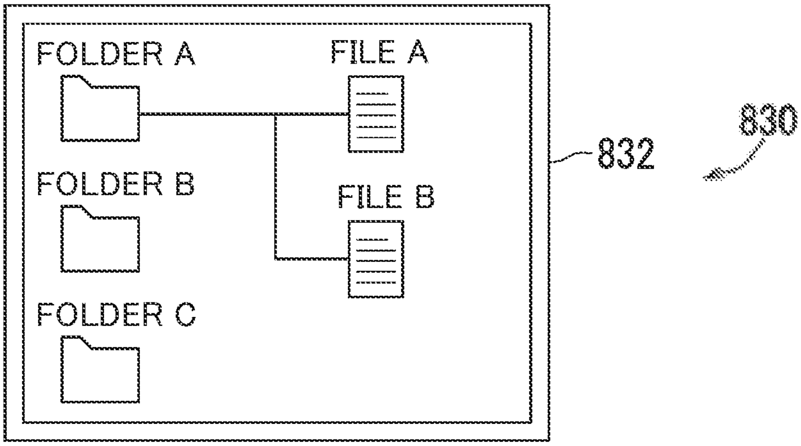
Figure 7C:
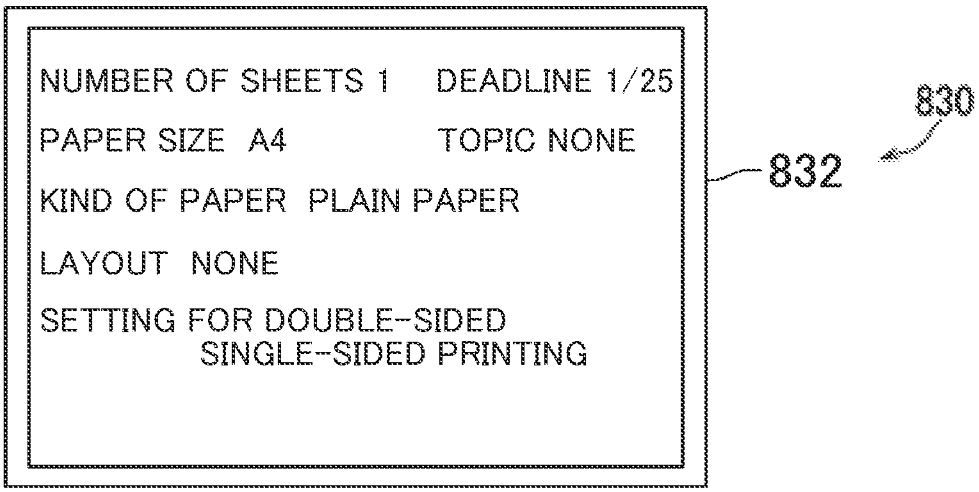

Next, with reference to FIGS. 1 to 7, printing of print data in the image forming apparatus 100 will be described. FIGS. 7A to 7C are schematic views of the display device 830 of the information processing apparatus 800 when print data is downloaded in the image forming apparatus 100. The information processing apparatus 800 is used for designating print data for forming an image on a sheet in the image forming apparatus 100.

As shown in FIG. 7A, in the information processing apparatus 800, the display device 830 has a display screen 832. The display device 830 displays the hierarchical structure of folders of the data management apparatus 300 in accordance with a hierarchical structure display signal. The display device 830 displays the hierarchical structure of folders in accordance with a hierarchical structure display signal.

Here, regarding folders, the folder A, the folder B, and the folder C are managed in the same level. The operation device 140 receives an operation of the operator selecting the folder A, the folder B, and the folder C.

If the operation device 140 receives an operation of the operator selecting any of the folder A, the folder B, and the folder C, here, if an operation of selecting the folder A is received, as shown in FIG. 7B, the display device 830 displays the hierarchical structure of the folder A, and while the display device 830 is displaying the hierarchical structure, the operation device 840 receives an operation of designating print data.

That is, as shown in FIG. 7A, the display device 830 displays a file or a folder inside the selected folder. Here, for example, while the display device 830 is displaying the hierarchical structure of folders, if the operation device 140 receives an operation of the operator selecting the folder A, as shown in FIG. 7B, the display device 830 displays the file A and the file B included in the selected folder A together with the folder A, the folder B, and the folder C. The operator can select the file A and the file B using the operation device 140.

Specifically, if the operation device 840 receives an operation of the operator selecting a file, the communication device 850 transmits a print data designation signal for designating a selected file to the data management apparatus 300. The communication device 850 may transmit a print data designation signal to the data management apparatus 300 via the image forming apparatus 100. Thereafter, if the communication device 850 receives display data related to a selected file from the data management apparatus 300, as shown in FIG. 7C, the display device 830 displays the display data related to the file. The display device 830 displays details indicated by display data in accordance with the display data.

Here, the display device 830 collectively displays the first display data and the second display data included in display data. The display device 830 displays printing conditions in accordance with the first display data and displays a deadline related to print data in accordance with the second display data.

The display device 830 displays printing conditions according to the first display data on the left side in the display screen 832. At the same time, the display device 830 displays a deadline related to print data according to the second display data on the right side in the display screen 832.

Figure 8A:
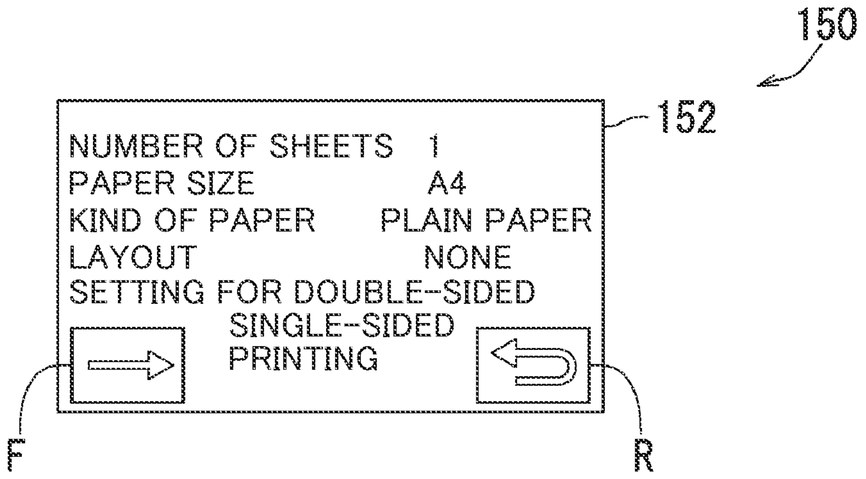
FIGS. 8A and 8B are schematic views showing display data displayed in the image forming apparatus of the data communication system of the present embodiment.
Figure 8B:
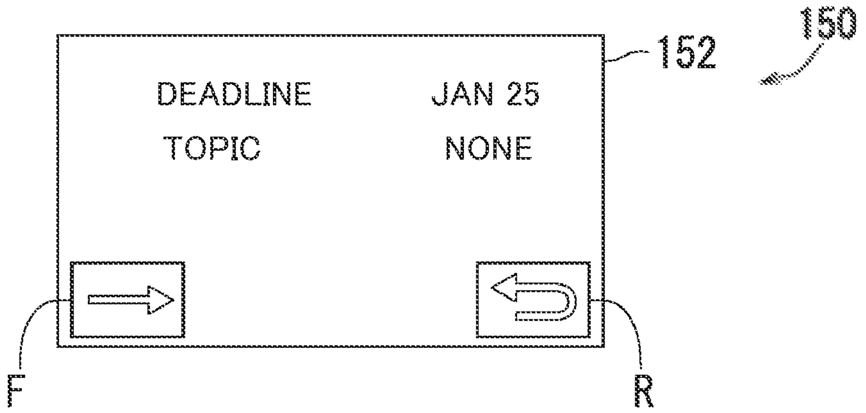

Next, with reference to FIG. 8, display of display data in the image forming apparatus 100 and the information processing apparatus 800 in the data communication system 10 of the present embodiment will be described. FIGS. 8A and 8B are schematic views showing display data displayed in the display device 150 of the image forming apparatus 100 in the data communication system 10 of the present embodiment. FIG. 80 is a schematic view showing display data displayed in the display device 830 of the information processing apparatus 800 in the data communication system 10 of the present embodiment.

As shown in FIG. 8A, in the image forming apparatus 100, the display device 150 displays the first display data related to a file in accordance with display data. Here, the first display data indicates printing conditions. The display device 150 displays printing conditions in accordance with the first display data.

The display screen 152 displays the first display data. The forward button F is located at the lower left in the display screen 152. The forward button F is a button for proceeding to a next display screen. If the forward button F is operated, the display screen changes to the next display screen.

As shown in FIG. 8B, the display device 150 displays the second display data. The display device 150 displays a deadline related to print data. The forward button F is located at the lower left in the display screen 152. The forward button F is a button for proceeding to a next display screen. If the forward button F is operated, the display screen changes to the next display screen.

Figure 8C:
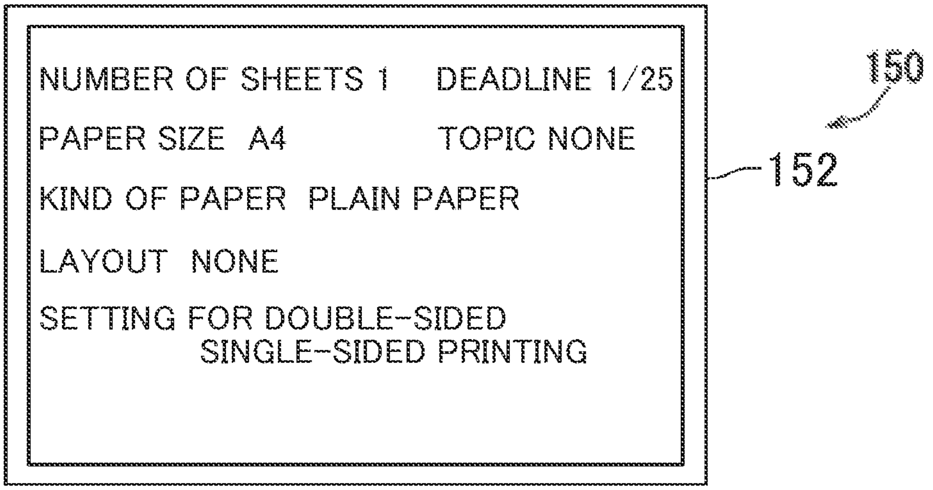
FIG. 8C is a schematic view showing display data displayed in an information processing apparatus of the data communication system of the present embodiment.

As shown in FIG. 8C, in the information processing apparatus 800, being different from the image forming apparatus 100, the display device 830 collectively displays the first display data and the second display data. The display device 830 displays printing conditions in accordance with the first display data and displays a deadline related to print data in accordance with the second display data. Here, the display device 830 displays printing conditions according to the first display data on the left side in the display screen 832 and displays a deadline related to print data according to the second display data on the right side in the display screen 832.

In the information processing apparatus 800, since the display screen 832 is large, printing conditions and the printing deadline can be displayed at the same time without switching.

In the description with reference to FIGS. 4 to 8, a form of the data communication system 10 in which display data stored in the data management apparatus 300 is displayed by the image forming apparatus 100 and the information processing apparatus 800 has been described, but the present embodiment is not limited to this. Display data stored in the data management apparatus 300 may be displayed by an apparatus other than the image forming apparatus 100 and the information processing apparatus 800. In addition, when display data stored in the data management apparatus 300 is displayed by an apparatus other than the image forming apparatus 100, the apparatus other than the image forming apparatus 100, being different from the information processing apparatus 800, may display a plurality of pieces of display data in separate screens.

Figure 9:
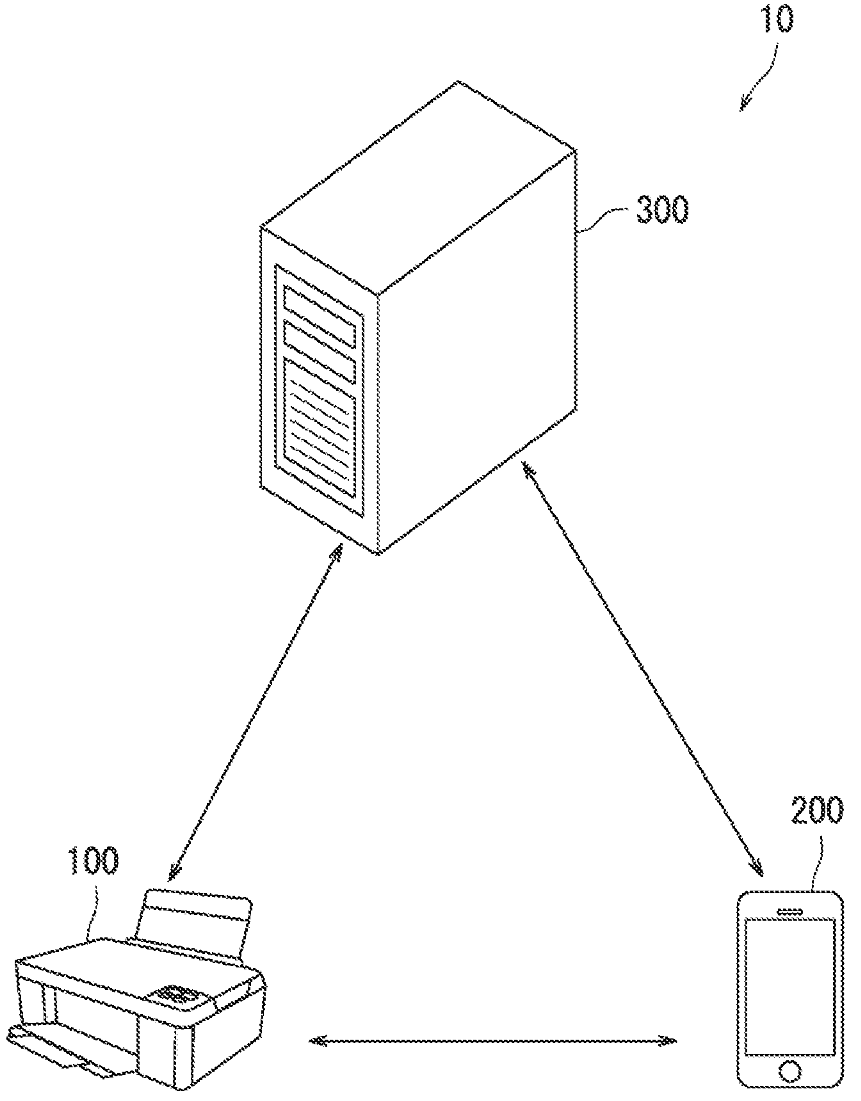
FIG. 9 is a schematic view of the data communication system of the present embodiment.

Next, with reference to FIG. 9, a constitution of the data communication system 10 of the present embodiment will be described. FIG. 9 is a schematic view of the data communication system 10.

As shown in FIG. 9, the data communication system 10 of the present embodiment includes the image forming apparatus 100 and an information processing terminal 200. The image forming apparatus 100 communicates with the data management apparatus 300. The information processing terminal 200 communicates with the image forming apparatus 100 and/or the data management apparatus 300. The data communication system 10 may further include the data management apparatus 300 in addition to the image forming apparatus 100 and the information processing terminal 200.

The information processing terminal 200 operates in association with the image forming apparatus 100. The information processing terminal 200 receives display data related to print data for forming an image on a sheet in the image forming apparatus 100 from the data management apparatus 300. The information processing terminal 200 may receive display data from the data management apparatus 300 via the image forming apparatus 100. The information processing terminal 200 receives display data stored in the data management apparatus 300 directly or indirectly from the data management apparatus 300 and displays the display data. The information processing terminal 200 may be a so-called smartphone, a mobile phone, or a tablet.

An application program which operates in association with the image forming apparatus 100 may be installed in the information processing terminal 200. For example, a general-purpose information processing terminal, in which an application program that operates in association with the image forming apparatus 100 is installed, can be used as the information processing terminal 200. For example, when an application program is installed in the information processing terminal from the data management apparatus 300, the information processing terminal functions as the information processing terminal 200.

The information processing terminal 200 may communicate with the image forming apparatus 100. For example, the information processing terminal 200 may transmit a signal to the image forming apparatus 100. In addition, the information processing terminal 200 may receive a signal from the image forming apparatus 100. Moreover, the information processing terminal 200 may transmit data to the data management apparatus 300. In addition, the information processing terminal 200 may receive data from the data management apparatus 300.

Both the image forming apparatus 100 and the information processing terminal 200 may be able to display display data. When the display screen of the display device is not relatively large in the information processing terminal 200, similar to the display device 150 of the image forming apparatus 100, the display device of the information processing terminal 200 may display a plurality of pieces of display data in separate screens.

When the image forming apparatus 100 and the information processing terminal 200 display a plurality of pieces of display data in separate screens, the way of dividing a plurality of pieces of display data in the image forming apparatus 100 may differ from the way of dividing a plurality of pieces of display data in the information processing terminal 200.

The information processing terminal 200 may be used for authenticating data communication between the image forming apparatus 100 and the data management apparatus 300. Alternatively, the information processing terminal 200 may be used for supplementation or substitution for the operation device and/or the display device of the image forming apparatus 100.

Figure 10:
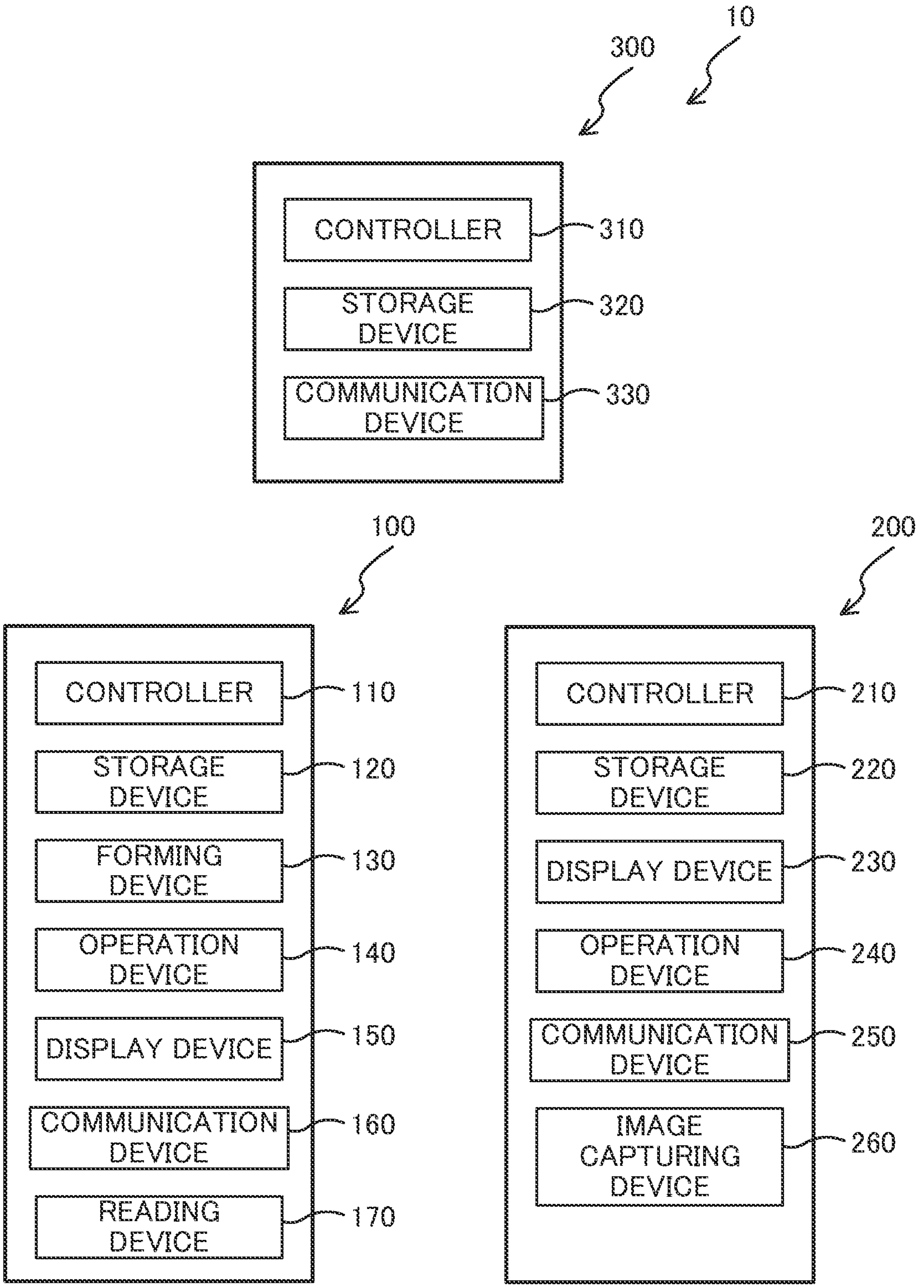
FIG. 10 is a schematic block diagram of the data communication system of the present embodiment.

Next, with reference to FIGS. 9 and 10, a constitution of the data communication system 10 will be described. FIG. 10 is a block diagram of the data communication system 10.

As shown in FIG. 10, the data communication system 10 includes the image forming apparatus 100 and the information processing terminal 200.

The information processing terminal 200 has a controller 210, a storage device 220, a display device 230, an operation device 240, and a communication device 250. The controller 210 controls the storage device 220, the display device 230, the operation device 240, and the communication device 250.

The controller 210 includes a computing element. The computing element includes a processor. As an example, the processor includes a central processing unit (CPU). The processor may include an application specific integrated circuit (ASIC).

The storage device 220 stores various kinds of data. The storage device 220 includes a main storage element such as a semiconductor memory, and an auxiliary storage element such as a semiconductor memory and/or a hard disk drive. For example, the storage device 220 stores a control program for driving the information processing terminal 200. The controller 210 controls operation of the information processing terminal 200 by executing the control program. Specifically, the processor of the controller 210 controls the constituents of the information processing terminal 200 by executing the computer program stored in the storage element of the storage device 220.

The display device 230 displays an operation screen or results of various kinds of processing. The display device 230 includes a liquid crystal display or an organic EL display.

The display device 230 may display an image in accordance with print data. In this case, the operator can visually recognize print data before the image forming apparatus 100 forms an image on a sheet. In addition, the display device 230 may display an image in accordance with display data related to print data.

The operation device 240 may include a touch sensor. The display device 230 and the operation device 240 may be integrated together in a touch panel. For example, the touch panel displays various keys for instructing the kind of job and the details of job. Alternatively, the operation device 240 may include buttons or a keyboard. The operation device 240 outputs a signal indicating an instruction corresponding to operation of the buttons, the keyboard, or the touch panel to the controller 110 or the like.

For example, the communication device 250 includes a network interface and communicates with external equipment. Here, the communication device 250 communicates with at least the image forming apparatus 100. For example, the communication device 250 receives a signal from the image forming apparatus 100 and transmits a signal to the image forming apparatus 100. Alternatively, the communication device 250 may be able to directly communicate with the data management apparatus 300.

The information processing terminal 200 may further have an image capturing device 260 capable of capturing images. The image capturing device 260 includes an image capturing element. For example, the image capturing element is a charge coupled device (CCD) image sensor, or a complementary metal oxide semiconductor (CMOS) image sensor.

According to the present embodiment, in both the image forming apparatus 100 and the information processing terminal 200, display data related to print data can displayed. For this reason, display data can be visually recognized from either the image forming apparatus 100 or the information processing terminal 200 in accordance with convenience of the operator.

As described above with reference to FIGS. 9 and 10, when the image forming apparatus 100 operates in association with the data management apparatus 300, it is preferable for the image forming apparatus 100 to be authenticated by the data management apparatus 300. In addition, it is preferable that authentication of the image forming apparatus 100 be performed using the information processing terminal 200.

Figure 11A:
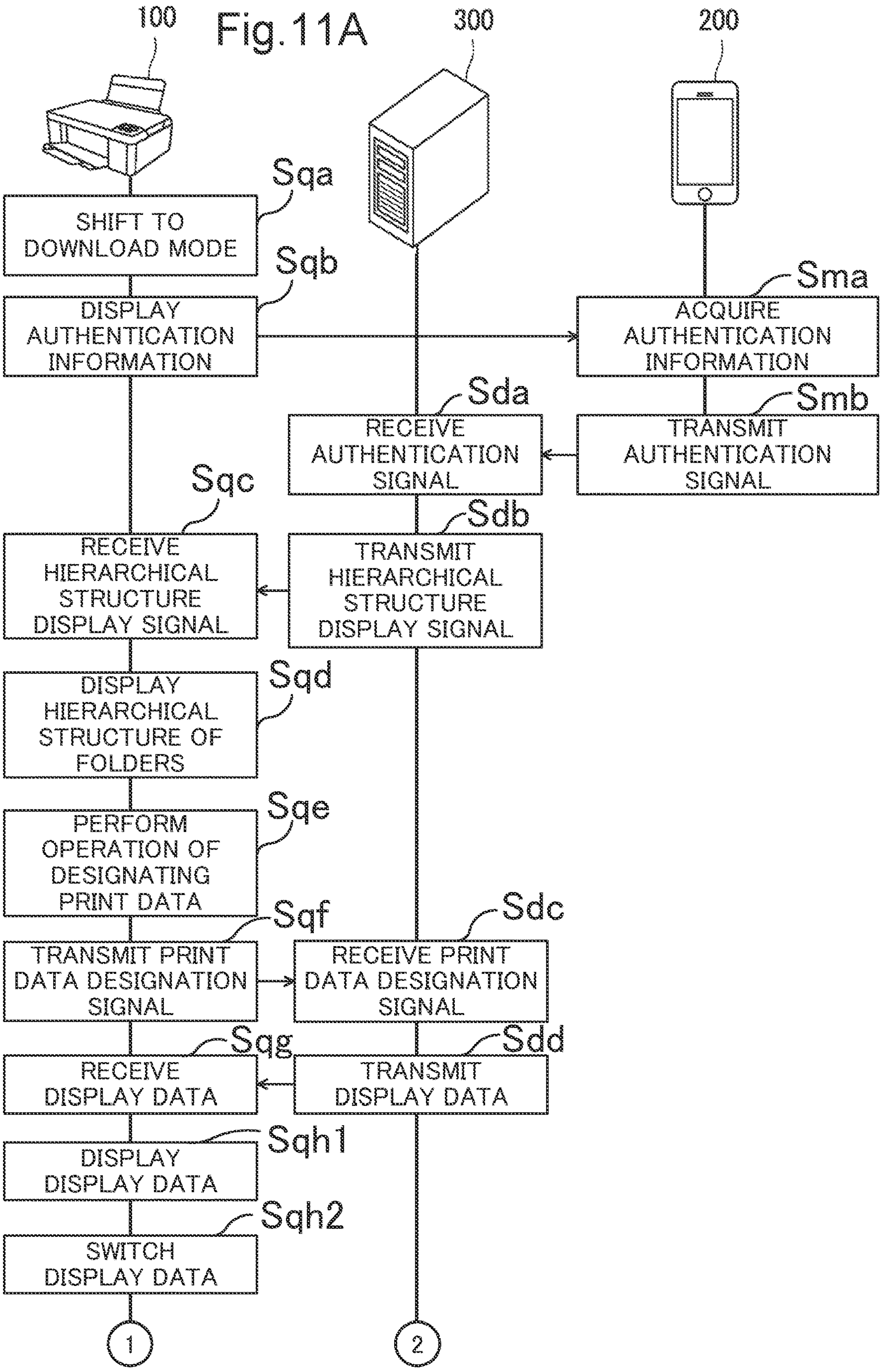
FIG. 11A is a flowchart of printing of print data in the data communication system of the present embodiment.
Figure 11B:
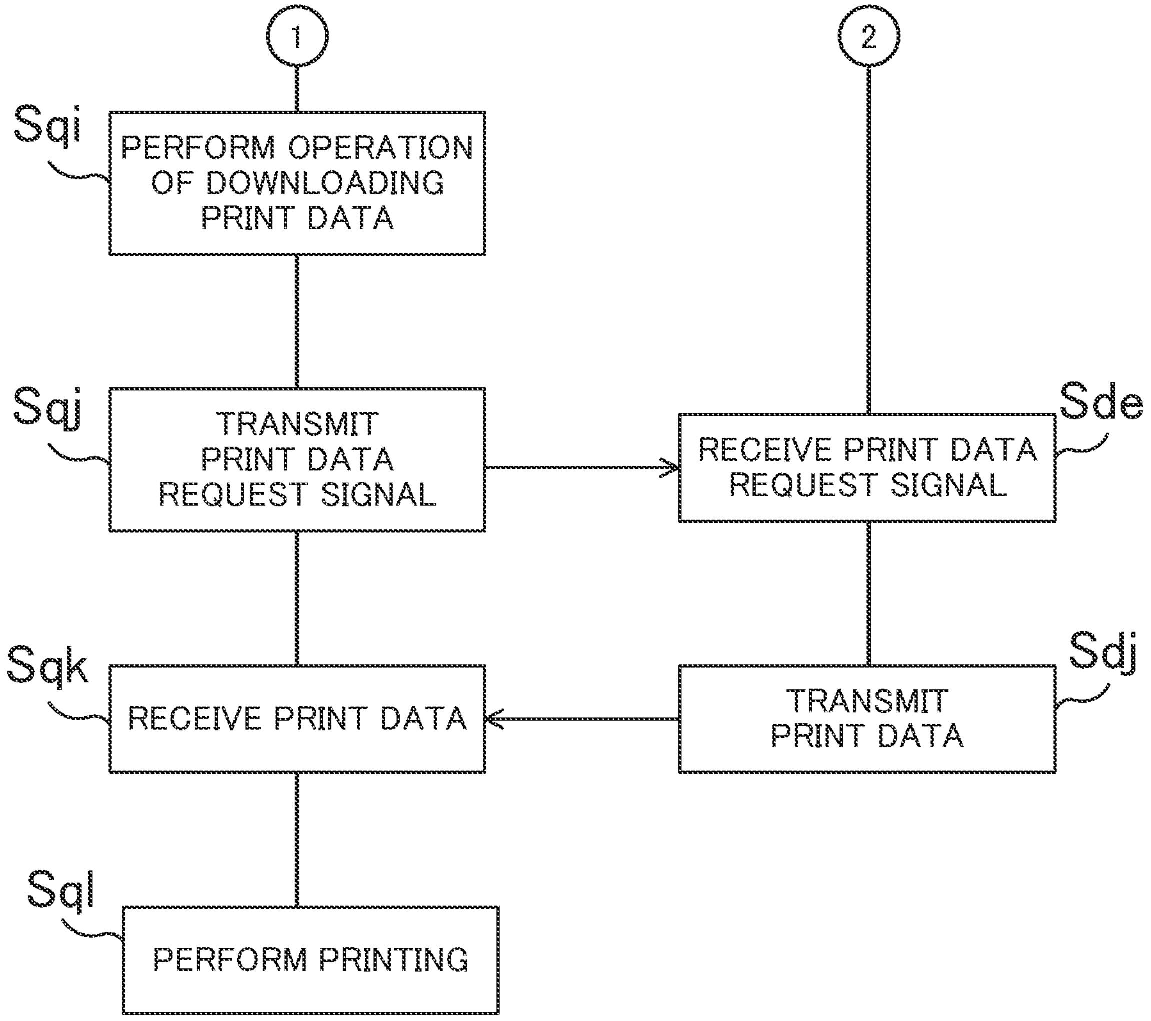
FIG. 11B is a flowchart of printing of print data in the data communication system of the present embodiment.

Next, with reference to FIGS. 9 to 11B, printing of print data in the data communication system 10 will be described. FIGS. 11A and 11B are flowcharts showing downloading of print data in the data communication system 10.

As shown in FIG. 11A, in Step Sqa, the image forming apparatus 100 shifts to the download mode. If the operation device 140 receives an operation of the operator for a shift to the download mode, the controller 110 shifts to the download mode.

In Step Sqb, the image forming apparatus 100 displays authentication information. The display device 150 displays authentication information unique to the image forming apparatus 100. Authentication information is information indicating that the image forming apparatus 100 has been authenticated with respect to the data management apparatus 300. For example, authentication information is two-dimensional code information. Authentication information may be a password.

In Step Sma, the information processing terminal 200 acquires authentication information. The image capturing device 260 captures an image of authentication information displayed in the display device 150 of the image forming apparatus 100. Alternatively, the operation device 240 receives an operation of the operator inputting authentication information displayed in the display device 150.

In Step Smb, the information processing terminal 200 transmits an authentication signal to the data management apparatus 300 on the basis of authentication information. The communication device 250 transmits an authentication signal to the data management apparatus 300. Specifically, the communication device 250 transmits an authentication signal to the data management apparatus 300. An authentication signal indicates that the image forming apparatus 100 is scheduled to download print data from the data management apparatus 300.

In Step Sda, the data management apparatus 300 receives an authentication signal from the information processing terminal 200. Specifically, the communication device 330 receives an authentication signal from the information processing terminal 200.

In Step Sdb, the data management apparatus 300 transmits a hierarchical structure display signal indicating the hierarchical structure of folders in the storage device 320 to the image forming apparatus 100. Specifically, the communication device 330 transmits a hierarchical structure display signal to the image forming apparatus 100.

In Step Sqc, the image forming apparatus 100 receives a hierarchical structure display signal from the data management apparatus 300. Specifically, the communication device 160 receives a hierarchical structure display signal from the data management apparatus 300.

In Step Sqd, the image forming apparatus 100 displays the hierarchical structure of folders in the storage device 320 in accordance with a hierarchical structure display signal. Specifically, the display device 150 displays the hierarchical structure of folders of the data management apparatus 300 in accordance with a hierarchical structure display signal. Typically, if the operation device 140 receives an operation of the operator, the display device 150 displays the hierarchical structure of folders of the data management apparatus 300.

In Step Sqe, the image forming apparatus 100 receives an operation of designating a folder for storing print data in the hierarchical structure of folders in the storage device 320. Typically, the operation device 140 receives an operation of designating a folder for storing print data in the hierarchical structure of folders.

In Step Sqf, the image forming apparatus 100 transmits a print data designation signal for designating data stored in the folder to the data management apparatus 300. Specifically, the communication device 160 transmits a print data designation signal to the data management apparatus 300.

In Step Sdc, the data management apparatus 300 receives a print data designation signal from the image forming apparatus 100. Specifically, the communication device 330 receives a print data designation signal from the image forming apparatus 100.

In Step Sdd, the data management apparatus 300 reads display data related to print data indicated by a print data designation signal and transmits it to the image forming apparatus 100. Specifically, the controller 310 reads display data related to print data indicated by a print data designation signal from the storage device 320. Thereafter, a communication device 340 transmits display data to the image forming apparatus 100.

In Step Sqg, the image forming apparatus 100 receives display data from the data management apparatus 300. Specifically, the communication device 160 receives display data transmitted from the communication device 330. As necessary, the storage device 120 stores display data.

In Step Sqh1, display data is displayed. Specifically, when the communication device 160 receives display data, the display device 150 displays a part of the display data included in the display data. For example, the display device 150 displays the first display data.

In Step Sqh2, display data is switched and displayed. Specifically, in Step Sqh2, the display device 150 displays display data different from the display data displayed in Step Sqh1. For example, when the display device 150 displays the first display data in Step Sqh1, the display device 150 displays the second display data in Step Sqh2.

As shown in FIG. 11B, in Step Sqi, in the image forming apparatus 100, the operation device 140 receives an operation for executing downloading of print data. The image forming apparatus 100 receives an instruction of executing downloading of print data.

In Step Sqj, the image forming apparatus 100 transmits a print data request signal to the data management apparatus 300. Specifically, the communication device 160 transmits a print data request signal to the data management apparatus 300.

In Step Sde, the data management apparatus 300 receives a print data request signal from the image forming apparatus 100. Specifically, the communication device 340 receives a print data request signal from the image forming apparatus 100.

In Step Sdj, the data management apparatus 300 reads print data designated by a print data designation signal in response to a print data request signal and transmits it to the image forming apparatus 100. Specifically, the controller 310 reads print data designated by a print data designation signal from the storage device 320. Thereafter, the communication device 340 transmits print data to the image forming apparatus 100.

In Step Sqk, the image forming apparatus 100 receives print data from the data management apparatus 300. Specifically, the communication device 160 receives print data transmitted from the communication device 330.

In Step Sql, the image forming apparatus 100 forms an image on a sheet in accordance with print data. Specifically, the forming device 130 forms an image on a sheet in accordance with print data.

In the image forming apparatus 100 of the present embodiment, print data can be downloaded from a predetermined folder of the data management apparatus 300 and an image can be formed on a sheet in accordance with print data. In the image forming apparatus 100, processing may not be performed regarding an input and a transmission of authentication information, and a constitution required for an input and a transmission of authentication information may not be provided.

In the data communication system 10, the image forming apparatus 100 may transmit scan data generated by reading a sheet to the data management apparatus 300.

Figure 12:
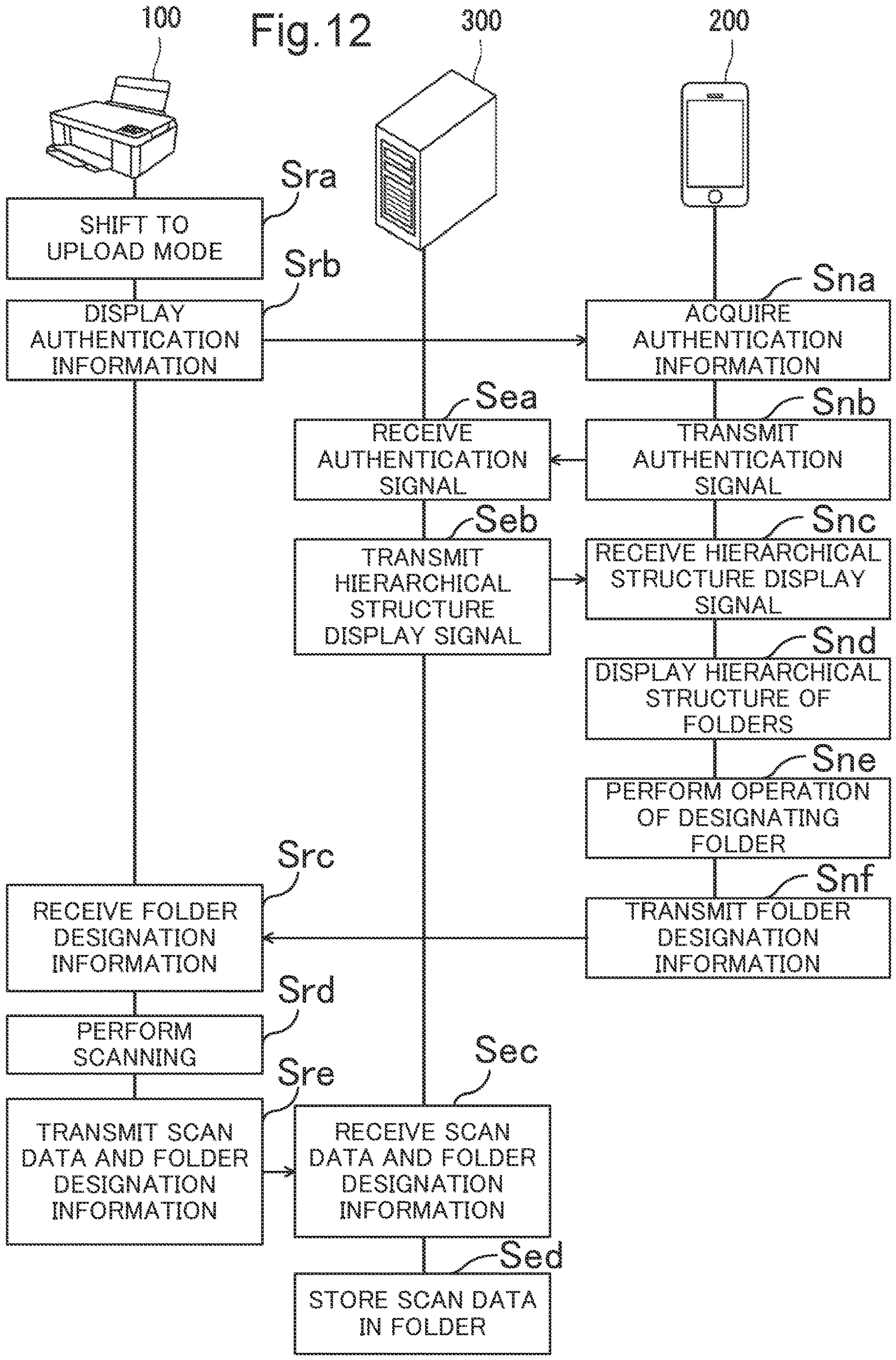
FIG. 12 is a flowchart of uploading scan data in the data communication system of the present embodiment.

Next, with reference to FIGS. 1 to 12, uploading of scan data in the data communication system 10 of the present embodiment will be described. FIG. 12 is a flowchart showing uploading of scan data in the data communication system 10 of the present embodiment.

As shown in FIG. 12, in Step Sra, the image forming apparatus 100 shifts to an upload mode. Specifically, if the operation device 140 receives an operation of the operator, the controller 110 shifts to the upload mode.

In Step Srb, the image forming apparatus 100 displays authentication information. Specifically, the display device 150 displays authentication information unique to the image forming apparatus 100. Authentication information is information indicating that the image forming apparatus 100 has been authenticated with respect to the data management apparatus 300. For example, authentication information is two-dimensional code information. Authentication information may be a password.

In Step Sna, the information processing terminal 200 acquires authentication information. Specifically, the image capturing device 260 captures an image of authentication information displayed in the display device 150 of the image forming apparatus 100. Alternatively, the operation device 240 receives an operation of the operator inputting authentication information displayed in the display device 150.

In Step Snb, the information processing terminal 200 transmits an authentication signal to the data management apparatus 300 on the basis of authentication information. Specifically, the communication device 250 transmits an authentication signal to the data management apparatus 300. An authentication signal indicates that the image forming apparatus 100 is scheduled to upload scan data on the data management apparatus 300.

In Step Sea, the data management apparatus 300 receives an authentication signal from the information processing terminal 200. Specifically, the communication device 330 receives an authentication signal from the information processing terminal 200. The controller 310 allows uploading of scan data from the image forming apparatus 100 in accordance with an authentication signal.

In Step Seb, the data management apparatus 300 transmits a hierarchical structure display signal indicating the hierarchical structure of folders in the storage device 320 to the information processing terminal 200. Specifically, the communication device 330 transmits a hierarchical structure display signal to the information processing terminal 200.

In Step Snc, the information processing terminal 200 receives a hierarchical structure display signal from the data management apparatus 300. Specifically, the communication device 250 receives a hierarchical structure display signal from the data management apparatus 300.

In Step Snd, the information processing terminal 200 displays the hierarchical structure of folders in the storage device 320 in accordance with a hierarchical structure display signal. Specifically, the display device 230 displays the hierarchical structure of folders of the data management apparatus 300 in accordance with a hierarchical structure display signal. Typically, if the operation device 240 receives an operation of the operator, the display device 230 displays the hierarchical structure of folders of the data management apparatus 300.

In Step Sne, in the information processing terminal 200, the operation device 240 receives an operation of designating a folder in the hierarchical structure of folders as a storage location. Accordingly, the information processing terminal 200 receives designation of a folder for storing scan data. In addition, the operation device 240 receives an operation of executing scanning of a sheet in the image forming apparatus 100.

In Step Snf, the information processing terminal 200 transmits folder designation information designating a folder for storing scan data in the hierarchical structure of folders of the data management apparatus 300 to the image forming apparatus 100. For example, if the operation device 240 receives an operation of executing scanning of the image forming apparatus 100, the communication device 250 transmits folder designation information to the image forming apparatus 100.

In Step Src, the image forming apparatus 100 receives folder designation information from the information processing terminal 200. Specifically, the communication device 160 receives folder designation information transmitted from the communication device 250.

In Step Srd, the image forming apparatus 100 scans a sheet. Specifically, the reading device 170 generates scan data by scanning a sheet. As necessary, the storage device 120 may store scan data.

In Step Sre, the image forming apparatus 100 transmits scan data and folder designation information to the data management apparatus 300. Specifically, the communication device 160 transmits scan data and folder designation information to the data management apparatus 300.

In Step Sec, the data management apparatus 300 receives scan data and folder designation information from the information processing terminal 200. Specifically, the communication device 330 receives scan data and folder designation information from the image forming apparatus 100.

In Step Sed, the data management apparatus 300 stores scan data in the folder designated in folder designation information.

According to the image forming apparatus 100 of the present embodiment, a folder for storing scan data can be simply designated. Accordingly, the image forming apparatus 100 can upload scan data on the data management apparatus 300. In the image forming apparatus 100, processing may not be performed regarding an input and a transmission of authentication information, and a constitution required for an input and a transmission of authentication information may not be provided. Moreover, in the image forming apparatus 100, the hierarchical structure of folders may not be displayed, and a constitution required for the display may not be provided.

In the foregoing description, the data management apparatus 300 stores print data and display data, but the present embodiment is not limited to this. The data management apparatus 300 may further store printing condition limitation information in addition to print data and display data.

Figure 13:
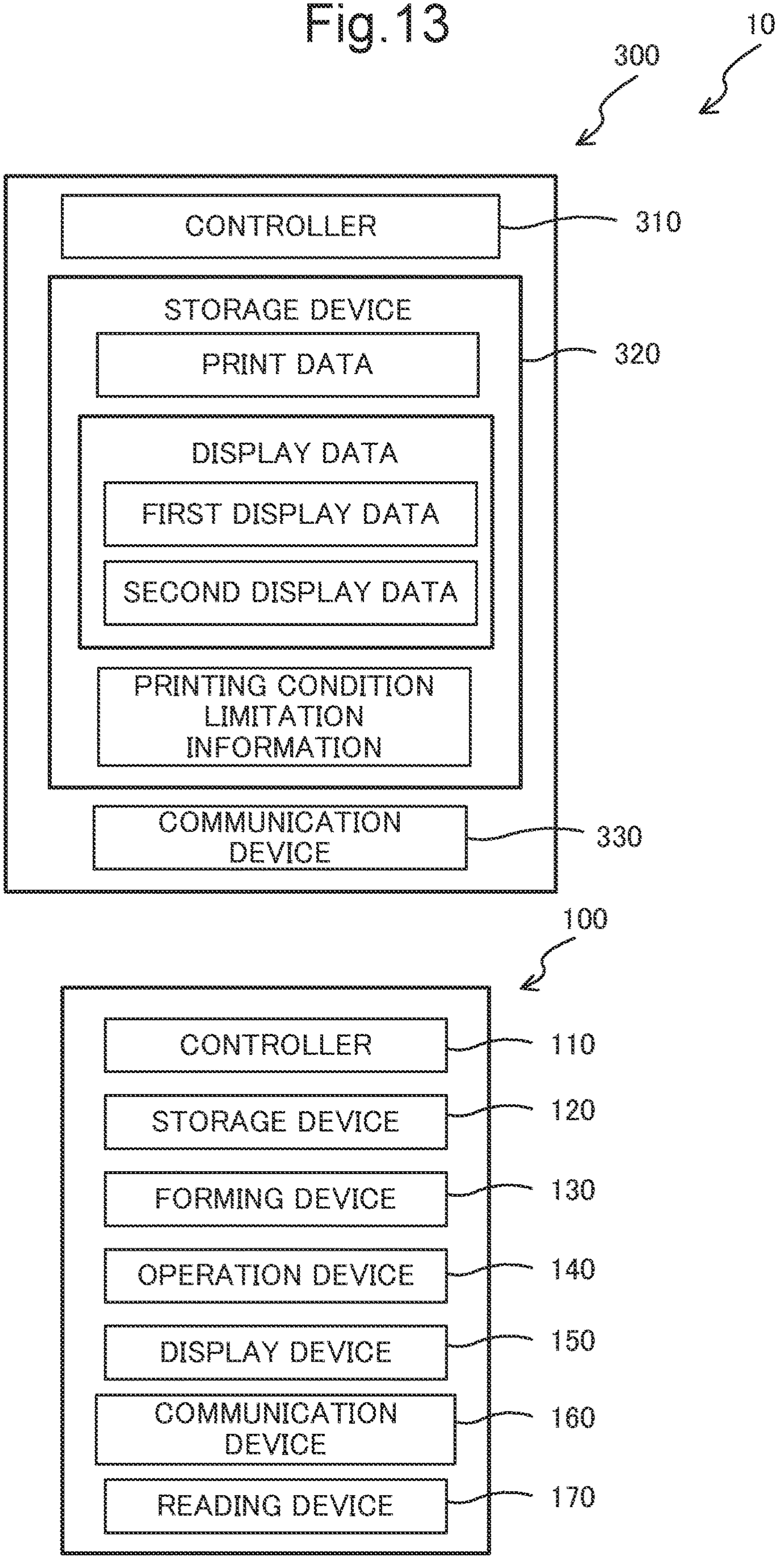
FIG. 13 is a block diagram of the data communication system including the image forming apparatus of the present embodiment.

Next, with reference to FIGS. 1 to 13, the data communication system 10 of the present embodiment will be described. FIG. 13 is a schematic view of the data communication system 10 of the present embodiment. The data communication system 10 shown in FIG. 13 has a constitution similar to that of the data communication system 10 in FIG. 2 except that the storage device 320 further stores printing condition limitation information in the data management apparatus 300, and duplicate description will be omitted for the purpose of avoiding redundancy.

As shown in FIG. 13, in the data management apparatus 300, the storage device 320 stores printing condition limitation information in addition to print data and display data. Printing condition limitation information indicates printing conditions limited when print data is downloaded and printed. Printing condition limitation information is stored in association with print data. Alternatively, printing condition limitation information may be set to a folder for storing print data.

For example, when printing condition limitation information indicates that printing of target print data by intensive printing is limited, this print data is set in the image forming apparatus 100 such that printing cannot be performed by intensive printing after downloading. Alternatively, when printing condition limitation information indicates that printing of target print data using a sheet other than that having a particular size is limited, this print data is set in the image forming apparatus 100 such that printing can only be performed in a particular size even after downloading.

In this manner, printing conditions when print data is printed can be limited by printing condition limitation information. For example, when data is uploaded as print data, printing conditions when print data is downloaded and printed can be partially limited.

When print data is designated, printing condition limitation information may be transmitted to the image forming apparatus 100 before, after, or at the same time as the data management apparatus 300 transmits print data.

Figure 14:
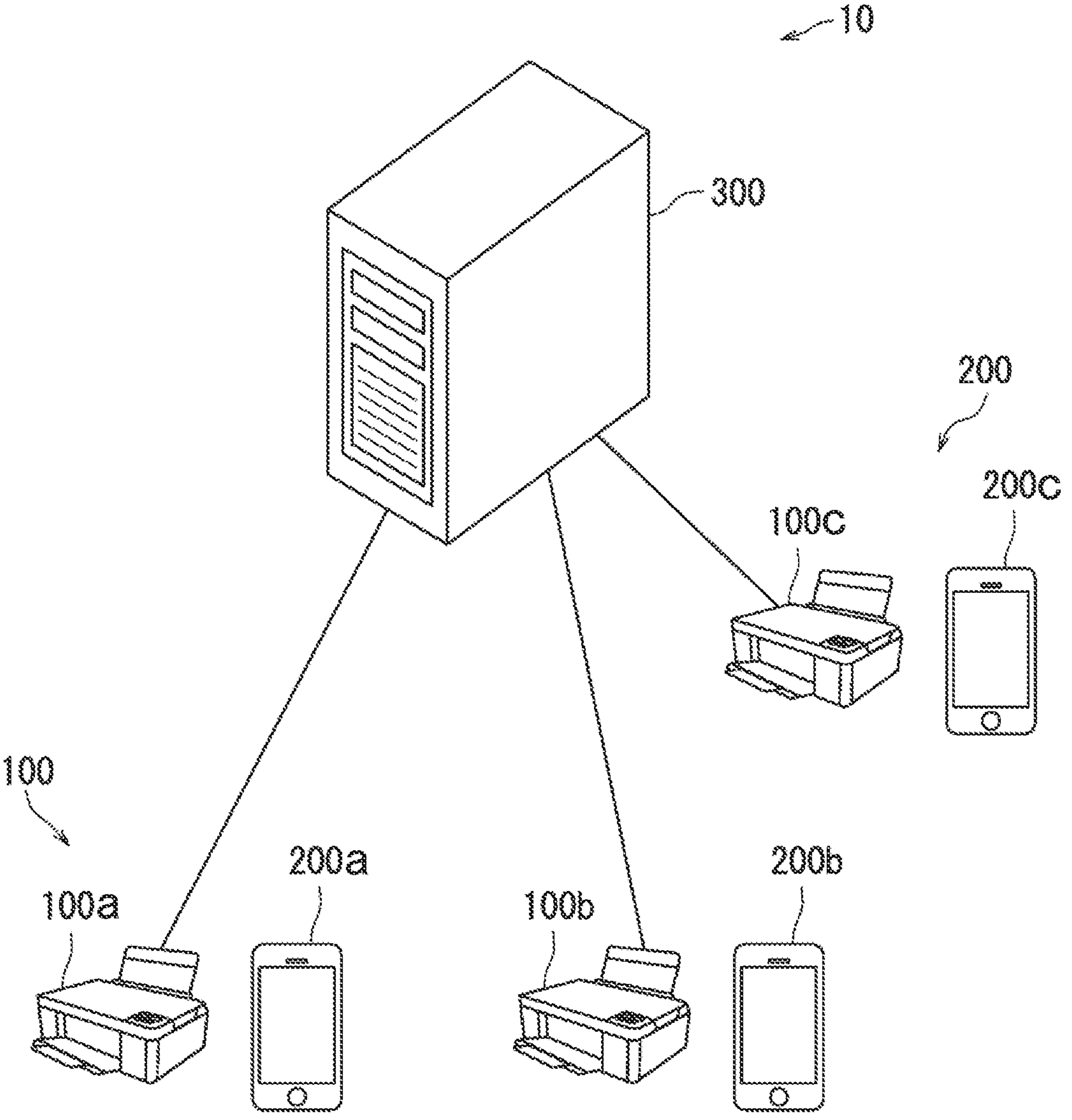
FIG. 14 is a schematic view of the data communication system of the present embodiment.

Next, with reference to FIG. 14, the image forming apparatus 100 of the present embodiment will be described. FIG. 14 is a schematic view of the data communication system 10. The data communication system 10 in FIG. 14 has a constitution similar to that of the data communication system 10 shown in FIG. 1 except that a plurality of image forming apparatuses 100 and a plurality of information processing terminals 200 are provided, and duplicate description will be omitted for the purpose of avoiding redundancy.

As shown in FIG. 14, the data communication system 10 of the present embodiment includes a plurality of image forming apparatuses 100*a* to 100*c* and a plurality of information processing terminals 200*a* to 200*c*. The image forming apparatus 100*a* operates in association with the information processing terminal 200*a*. The image forming apparatus 100*b* operates in association with the information processing terminal 200*b*. The image forming apparatus 100*c* operates in association with the information processing terminal 200*c*.

In this specification, the image forming apparatuses 100*a* to 100*c* may be generically described as the image forming apparatuses 100. In addition, in this specification, the information processing terminals 200*a* to 200*c* may be generically described as the information processing terminals 200.

The information processing terminal 200 may be used for authenticating data communication between the image forming apparatus 100 and the data management apparatus 300. Alternatively, the information processing terminal 200 may be used for supplementation or substitution for the operation device 140 and/or the display device 230 of the image forming apparatus 100.

Figure 15:
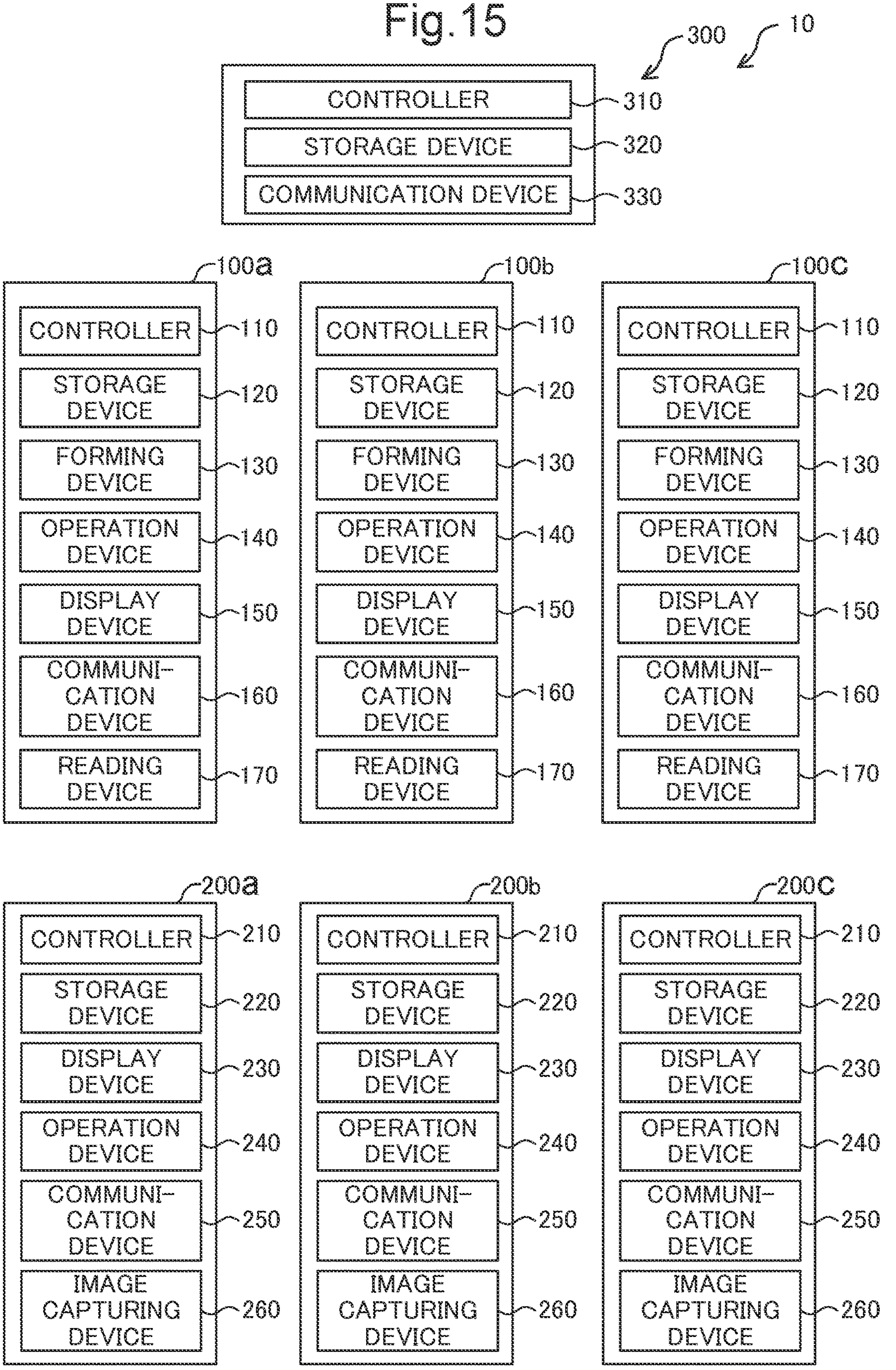
FIG. 15 is a block diagram of the data communication system of the present embodiment.

Next, with reference to FIGS. 14 and 15, a constitution of the data communication system 10 will be described. FIG. 15 is a block diagram of the data communication system 10.

As shown in FIG. 15, the data communication system 10 includes a plurality of image forming apparatuses 100*a* to 100*c* and a plurality of information processing terminals 200*a* to 200*c*. The data communication system 10 may include the data management apparatus 300.

Each of the image forming apparatuses 100*a* to 100*c* has the controller 110, the storage device 120, the forming device 130, the operation device 140, the display device 150, and the communication device 160. The controller 110 controls the storage device 120, the forming device 130, the operation device 140, the display device 150, and the communication device 160. Each of the image forming apparatuses 100*a* to 100*c* may further have the reading device 170.

Each of the information processing terminals 200*a* to 200*c* has the controller 210, the storage device 220, the display device 230, the operation device 240, and the communication device 250. The controller 210 controls the storage device 220, the display device 230, the operation device 240, and the communication device 250. Each of the information processing terminals 200*a* to 200*c* may have the image capturing device 260.

The data communication system 10 shown in FIGS. 14 and 15 includes a plurality of image forming apparatuses 100, but the functions of the plurality of image forming apparatuses 100 may not be equivalent to each other. In addition, the data communication system 10 shown in FIGS. 14 and 15 includes a plurality of information processing terminals 200 in addition to the plurality of image forming apparatuses 100, but the functions of the plurality of information processing terminals 200 may not be equivalent to each other.

Figure 16:
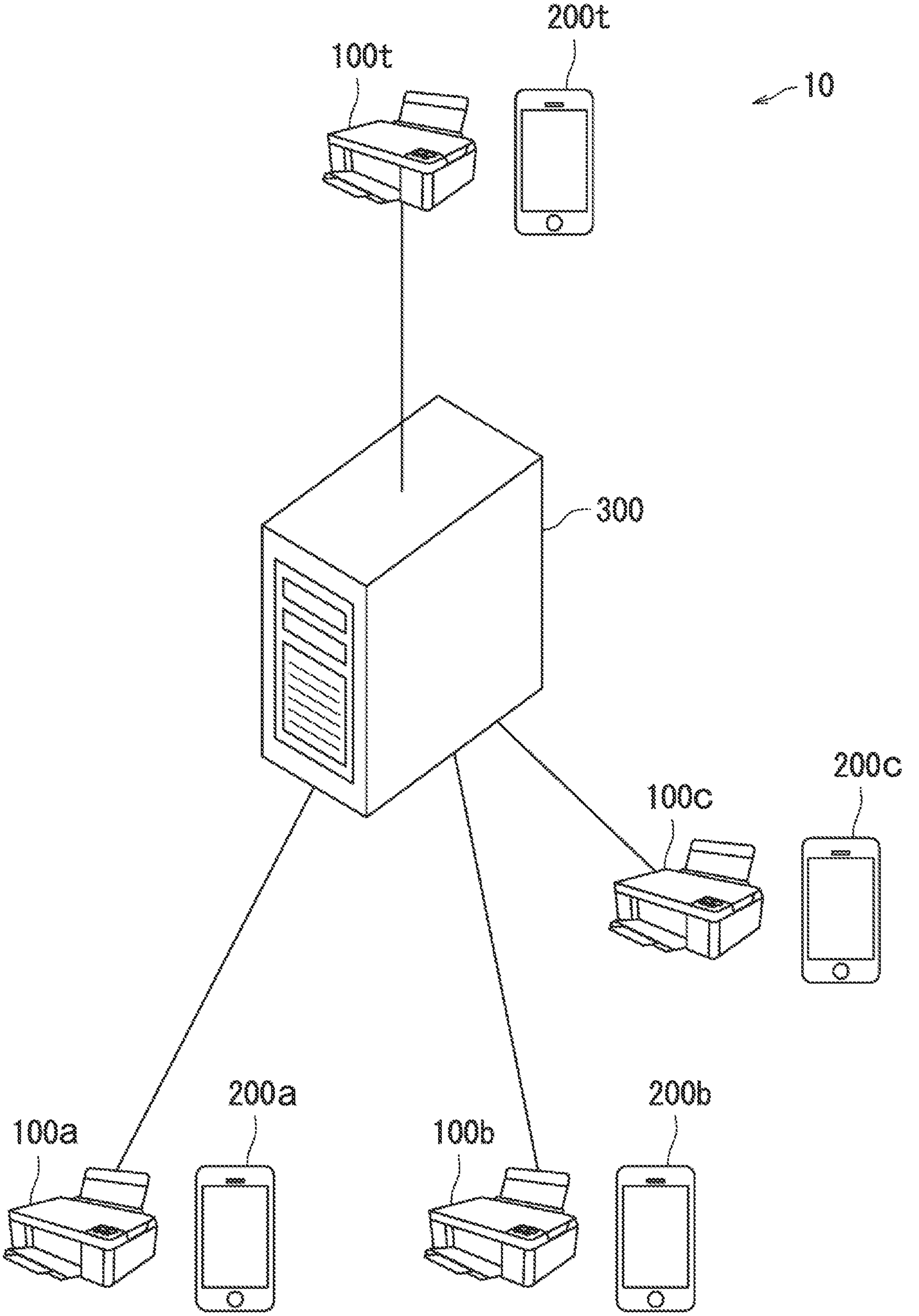
FIG. 16 is a schematic view of the data communication system of the present embodiment.

Next, with reference to FIGS. 1 to 16, the data communication system 10 of the present embodiment will be described. FIG. 16 is a schematic view of the data communication system 10. The data communication system 10 in FIG. 16 has a constitution similar to that of the data communication system 10 shown in FIGS. 10 to 15 except that the functions of the image forming apparatus 100 and the information processing terminal 200 are different, and duplicate description will be omitted for the purpose of avoiding redundancy.

As shown in FIG. 16, the data communication system 10 of the present embodiment has a plurality of image forming apparatuses 100. The plurality of image forming apparatuses 100 include the image forming apparatuses 100*a* to 100*c* and an image forming apparatus 100*t*. The functions of the image forming apparatuses 100*a* to 100*c* are equivalent to each other. On the other hand, the function of the image forming apparatus 100*t* differs from the functions of the image forming apparatuses 100*a* to 100*c*. The image forming apparatus 100*t* has a function that is not allowed to the image forming apparatuses 100*a* to 100*c*.

The data communication system 10 of the embodiment may include a plurality of information processing terminals 200 which operate in association with the plurality of image forming apparatuses 100. The plurality of information processing terminals 200 include the information processing terminals 200*a* to 200*c* and an information processing terminal 200*t*. The functions of the information processing terminals 200*a* to 200*c* are equivalent to each other. On the other hand, the function of the information processing terminal 200*t* differs from the functions of the information processing terminals 200*a* to 200*c*. The information processing terminal 200*t* has a function that is not allowed to the information processing terminals 200*a* to 200*c*.

For example, the image forming apparatus 100*t* or the information processing terminal 200*t* may be able to set printing conditions in a case of downloading and printing scan data when the scan data is uploaded on the data management apparatus 300. Meanwhile, the image forming apparatuses 100*a* to 100*c* or the information processing terminals 200*a* to 200*c* may not be able to set printing conditions in a case of downloading and printing scan data when the scan data is uploaded on the data management apparatus 300.

The data communication system 10 of the present embodiment is favorably utilized for distribution of assignments, collection of answers, evaluation of answers, and return of evaluation results. In this case, the image forming apparatus 100*t* and the information processing terminal 200*t* are favorably used by an assignment distributor who distributes assignments. Examples of an assignment distributor include a manager, a teacher, and an instructor.

The image forming apparatuses 100*a* to 100*c* and the information processing terminals 200*a* to 200*c* are favorably used by answerers who answer an assignment. Examples of answerers include persons to be managed, pupils, and students.

Next, with reference to FIGS. 1 to 19, the data communication system 10 of the present embodiment will be described. FIGS. 17A to 19B are schematic explanatory views of uploading of scan data and downloading of print data utilizing the folders in the data communication system 10 of the present embodiment. Here, an operator of the image forming apparatus 100*t* and the information processing terminal 200*t* will be regarded as an operator T. In addition, an operator of the image forming apparatus 100*a* and the information processing terminal 200*a* will be regarded as an operator A, an operator of the image forming apparatus 100*b* and the information processing terminal 200*b* will be regarded as an operator B, and an operator of the image forming apparatus 100*c* and the information processing terminal 200*c* will be regarded as an operator C.

Figure 17A:
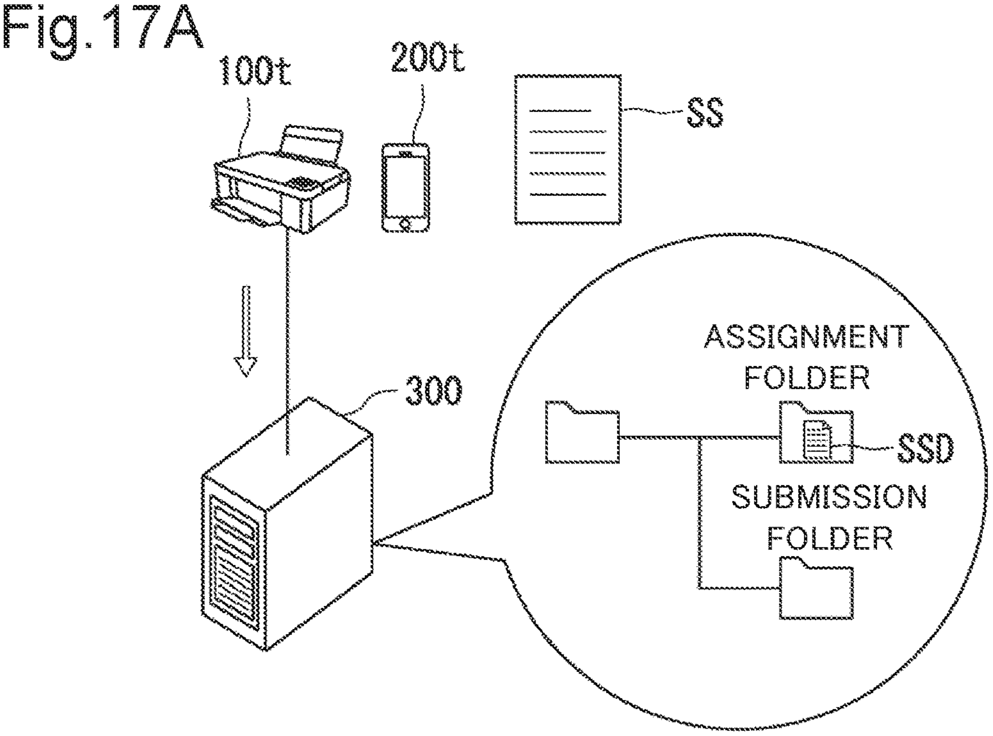
FIGS. 17A and 17B are schematic explanatory views of uploading of scan data and downloading of print data utilizing folders in the data communication system of the present embodiment.

As shown in FIG. 17A, the image forming apparatus 100*t* generates assignment scan data SSD by scanning an assignment sheet SS. Thereafter, the image forming apparatus 100*t* transmits the assignment scan data SSD to the data management apparatus 300.

The data management apparatus 300 has an assignment folder and a submission folder as folders. The assignment folder is used for distributing the assignment sheet SS. The submission folder is used when an answer sheet RS made by writing an answer in the assignment sheet SS is submitted. The assignment folder and the submission folder may be created in the data management apparatus 300 using the image forming apparatus 100*t* or the information processing terminal 200*t*.

The image forming apparatus 100*t* transmits the assignment scan data SSD to the data management apparatus 300 together with folder designation information designating the assignment folder. The image forming apparatus 100*t* or the information processing terminal 200*t* may set printing conditions when downloading is performed from the assignment folder. Printing conditions may be set by the operator T operating the image forming apparatus 100*t*. In addition, a print data deadline can also be able to be set by an operation of the image forming apparatus 100*t*, and the set print data deadline may be transmitted from the image forming apparatus 100*t* to the data management apparatus 300. In addition, the printing condition limitation information described above may be generated by an operation of the information processing terminal 200*t*, and the printing condition limitation information may be transmitted from the information processing terminal 200*t* to the data management apparatus 300.

The data management apparatus 300 receives the assignment scan data SSD together with folder designation information designating the assignment folder. The data management apparatus 300 stores the assignment scan data SSD inside the assignment folder of the hierarchical structure. Accordingly, the assignment scan data SSD is uploaded on the assignment folder of the hierarchical structure in the data management apparatus 300.

Figure 17B:
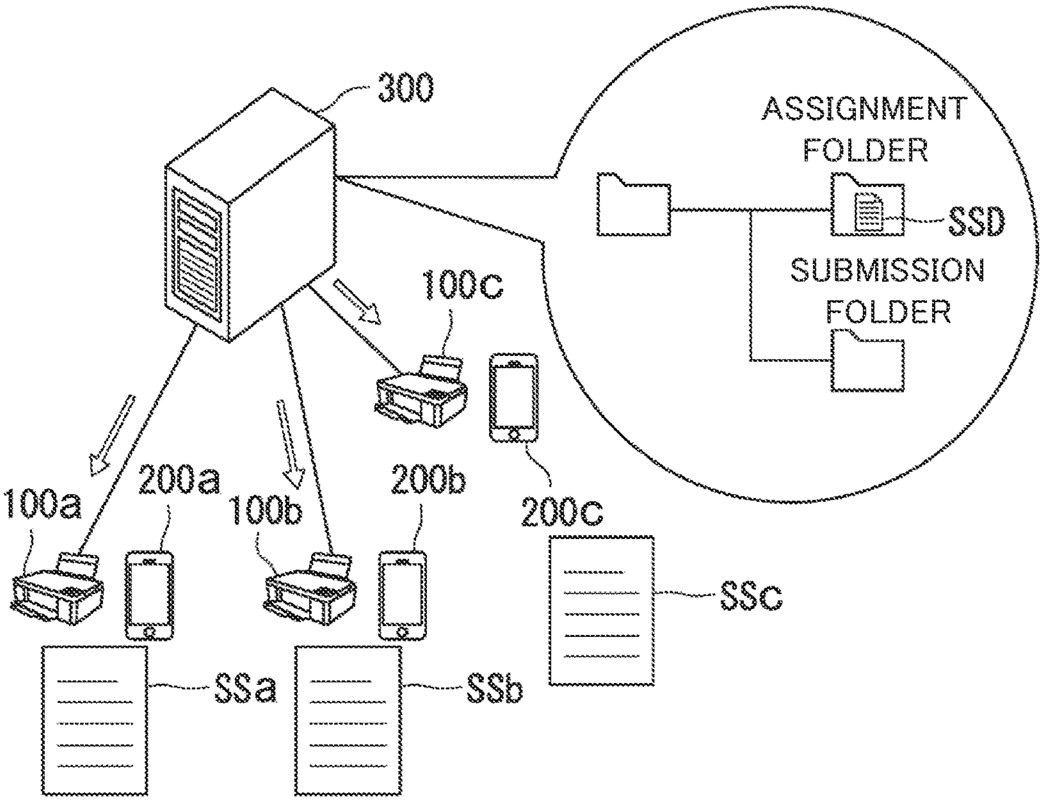

As shown in FIG. 17B, the image forming apparatuses 100*a* to 100*c* read and receive the assignment scan data SSD from the assignment folder of the hierarchical structure in the data management apparatus 300. Accordingly, the assignment scan data SSD is downloaded from the assignment folder of the hierarchical structure of folders of the data management apparatus 300 to the image forming apparatuses 100*a* to 100*c*.

The image forming apparatus 100*a* forms an image corresponding to the assignment scan data SSD on a sheet. Accordingly, the image forming apparatus 100*a* can form an assignment sheet SSa.

Similarly, the image forming apparatus 100*b* and the image forming apparatus 100*c* form images corresponding to the assignment scan data SSD on sheets. Accordingly, the image forming apparatus 100*b* and the image forming apparatus 100*c* can form assignment sheets SSb and SSc. Typically, the assignment sheets SSa to SSc of the image forming apparatuses 100*a* to 100*c* are the same.

Thereafter, typically, the operator A writes an answer in the assignment sheet SSa. Accordingly, the assignment sheet SSa becomes an answer sheet RSa.

Similarly, the operator B writes an answer in the assignment sheet SSb. Accordingly, the assignment sheet SSb becomes an answer sheet RSb. The operator C writes an answer in the assignment sheet SSc. Accordingly, the assignment sheet SSc becomes an answer sheet RSc.

Figure 18A:
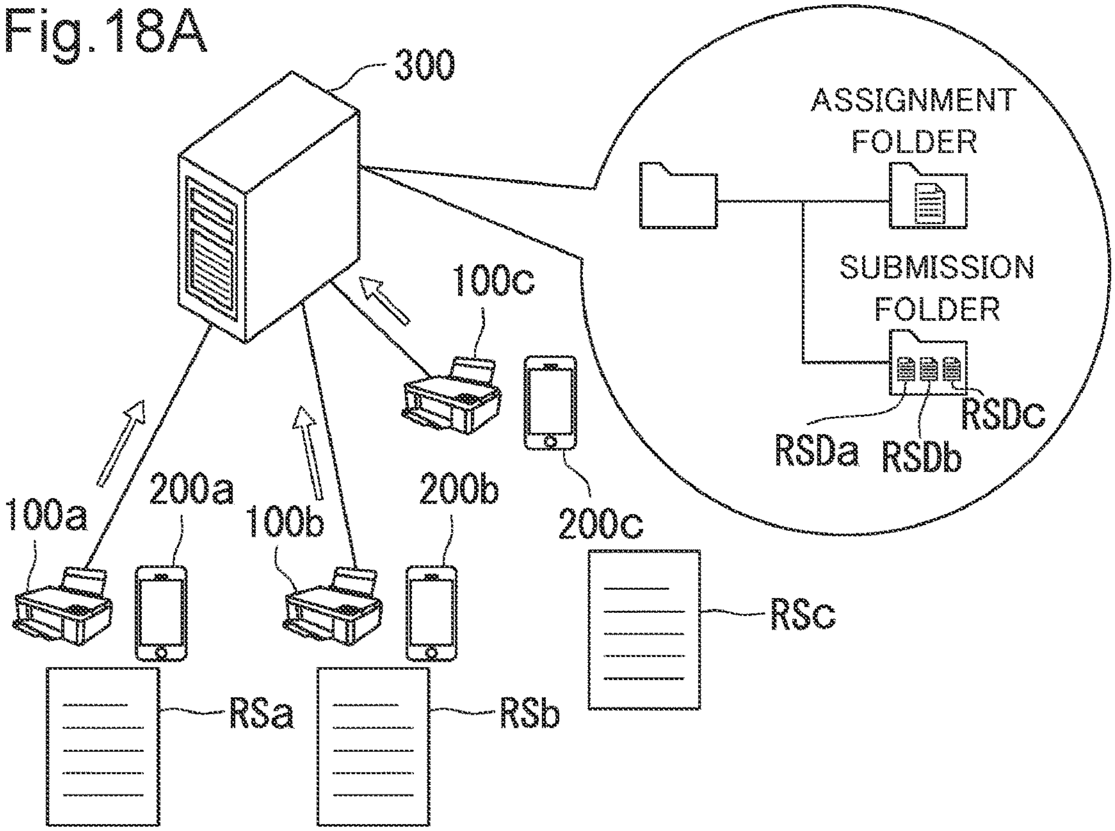
FIGS. 18A and 18B are schematic explanatory views of uploading of scan data and downloading of print data utilizing folders in the data communication system of the present embodiment.

As shown in FIG. 18A, the image forming apparatus 100*a* generates answer scan data RSDa obtained by scanning the answer sheet RSa and transmits it to the data management apparatus 300. At this time, the image forming apparatus 100*a* designates a submission folder of the hierarchical structure in the data management apparatus 300 for storing the answer scan data RSDa and transmits the answer scan data RSDa.

Accordingly, the answer scan data RSDa is uploaded on the submission folder of the hierarchical structure in the data management apparatus 300 from the image forming apparatus 100*a*.

Similarly, the image forming apparatus 100*b* generates answer scan data RSDb obtained by scanning the answer sheet RSb and transmits it to the data management apparatus 300. At this time, the image forming apparatus 100*b* designates a submission folder of the hierarchical structure in the data management apparatus 300 for storing the answer scan data RSDb and transmits the answer scan data RSDb. Accordingly, the answer scan data RSDb is uploaded on the submission folder of the hierarchical structure in the data management apparatus 300 from the image forming apparatus 100*b*.

Similarly, the image forming apparatus 100*c* generates answer scan data RSDc obtained by scanning the answer sheet RSc and transmits it to the data management apparatus 300. At this time, the image forming apparatus 100*c* designates a submission folder of the hierarchical structure in the data management apparatus 300 for storing the answer scan data RSDc and transmits the answer scan data RSDc. Accordingly, the answer scan data RSDc is uploaded on the submission folder of the hierarchical structure in the data management apparatus 300 from the image forming apparatus 100*c*.

Figure 18B:
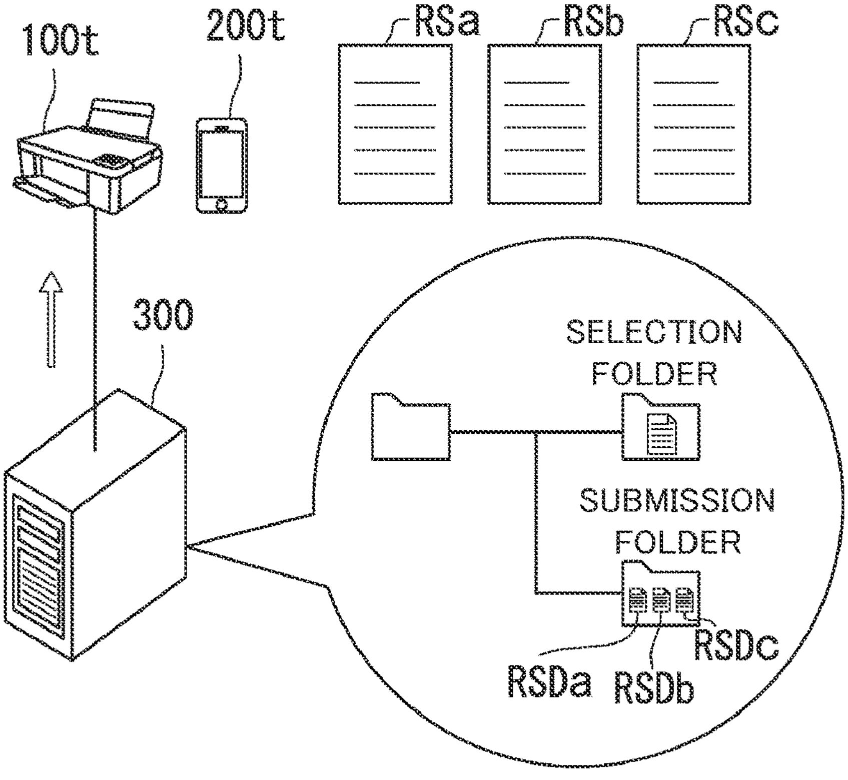

As shown in FIG. 18B, the image forming apparatus 100*t* forms images on sheets by reading the answer scan data RSDa to the answer scan data RSDc from the submission folder in the data management apparatus 300. Accordingly, the answer scan data RSDa to the answer scan data RSDc are downloaded from the submission folder of the hierarchical structure of folders of the data management apparatus 300 to the image forming apparatus 100*t*. The image forming apparatus 100*t* forms images corresponding to the answer scan data RSDa to the answer scan data RSDc on sheets. Accordingly, the image forming apparatus 100*t* can form the answer sheets RSa to RSc.

Regarding the answer scan data RSDa to the answer scan data RSDc, the image forming apparatus 100*t* may perform display by extracting only data in which the date and time when each piece of answer scan data is transmitted to the data management apparatus 300 are included in a time zone designated by the operator. In addition, regarding the answer scan data RSDa to the answer scan data RSDc, the image forming apparatus 100*t* may perform display excluding data which has been marked by the operator T (which will be described below). Even with these, data desired by the operator T can be preferentially displayed, and therefore limitation of display according to display data related to print data can be curbed.

Figure 19A:
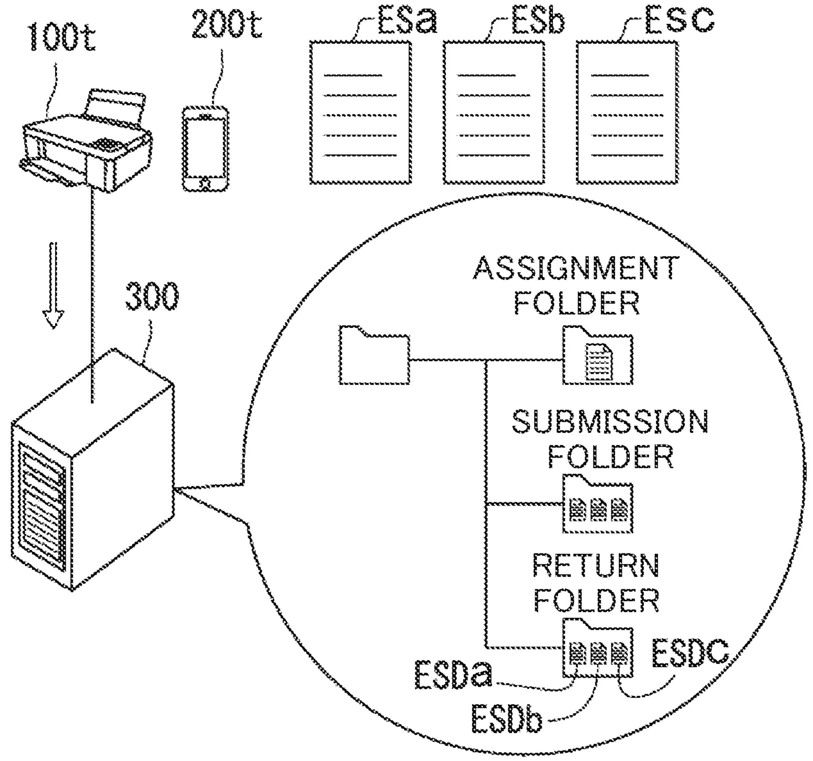
FIGS. 19A and 19B are schematic explanatory views of uploading of scan data and downloading of print data utilizing folders in the data communication system of the present embodiment.

Thereafter, typically, the operator T writes evaluations on the answer sheets RSa to RSc. For example, the operator T marks the answer sheets RSa to RSc. Accordingly, as shown in FIG. 19A, the answer sheets RSa to RSc become evaluation result sheets ESa to ESc.

The image forming apparatus 100*t* generates evaluation result scan data ESDa to a evaluation result scan data ESDc by scanning the evaluation result sheets ESa to ESc. Thereafter, as shown in FIG. 19A, the image forming apparatus 100*t* transmits the evaluation result scan data ESDa to the evaluation result scan data ESDc to the data management apparatus 300.

Here, the data management apparatus 300 has a return folder as a folder in addition to the assignment folder and the submission folder. The return folder is used for returning the evaluation result sheets ESa to ESc. The return folder may be created in the data management apparatus 300 using the image forming apparatus 100*t* or the information processing terminal 200*t*.

The image forming apparatus 100*t* transmits the evaluation result scan data ESDa to the evaluation result scan data ESDc to the data management apparatus 300 together with folder designation information designating a return folder.

The data management apparatus 300 receives the evaluation result scan data ESDa to the evaluation result scan data ESDc together with folder designation information designating a return folder. The data management apparatus 300 stores the evaluation result scan data ESDa to the evaluation result scan data ESDc in the return folder of the hierarchical structure. Accordingly, the evaluation result scan data ESDa to the evaluation result scan data ESDc are uploaded on the return folder of the hierarchical structure in the data management apparatus 300.

Figure 19B:
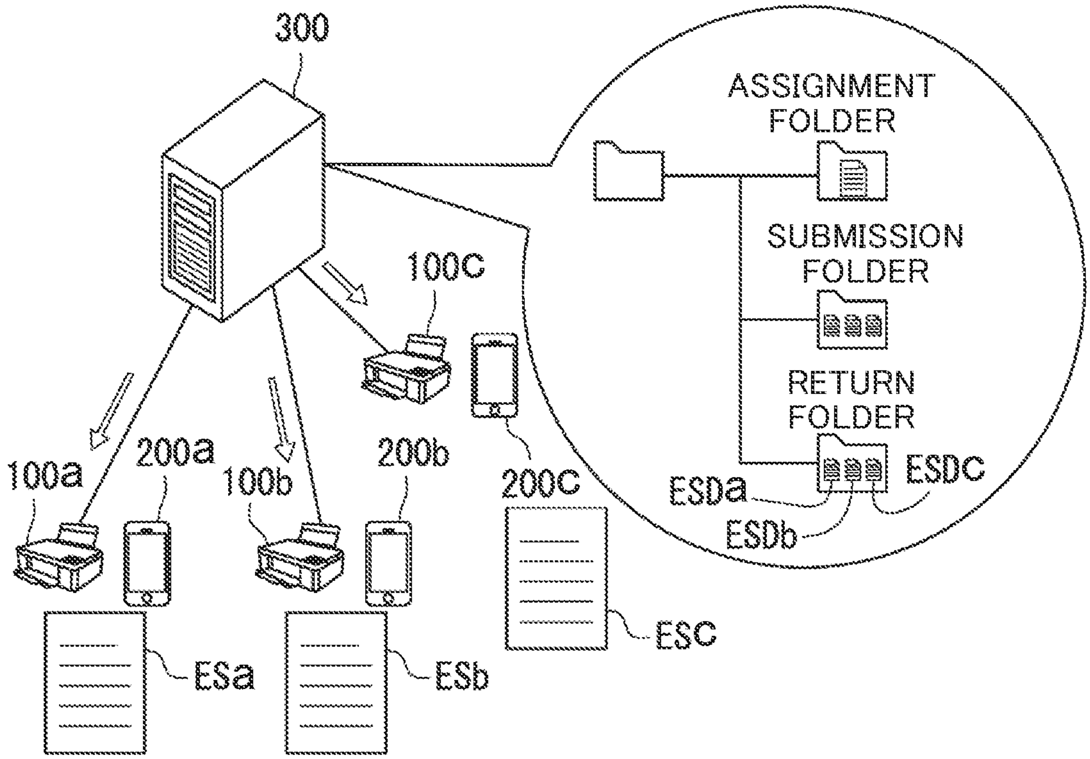

As shown in FIG. 19B, the image forming apparatuses 100*a* to 100*c* read and receive the evaluation result scan data ESDa to the evaluation result scan data ESDc from the return folder of the hierarchical structure in the data management apparatus 300. Accordingly, the evaluation result scan data ESDa to the evaluation result scan data ESDc are downloaded to the image forming apparatuses 100*a* to 100*c* from the return folder of the hierarchical structure of folders of the data management apparatus 300.

The image forming apparatus 100*a* forms an image corresponding to the evaluation result scan data ESDa on a sheet. Accordingly, the image forming apparatus 100*a* can form the evaluation result sheet ESa. Similarly, the image forming apparatus 100*b* and the image forming apparatus 100*c* form images corresponding to the evaluation result scan data ESDb and the evaluation result scan data ESDc on sheets. Accordingly, the image forming apparatus 100*b* and the image forming apparatus 100*c* can form the assignment sheets ESb and ESc.

As above, according to the present embodiment, distribution of assignments, collection of answers, evaluation of answers, and transmission of evaluation results can be favorably executed.

In FIG. 17B, the image forming apparatuses 100*a* to 100*c* download the assignment scan data SSD and form the assignment sheets SSa to SSc. In this case, the data management apparatus 300 may create a download list indicating the image forming apparatuses 100*a* to 100*c* or the operators A to C that have downloaded the assignment scan data SSD by checking the image forming apparatuses 100*a* to 100*c* or the operators A to C that have downloaded the assignment scan data SSD.

The download list can be accessed from the image forming apparatus 100*t* and/or the information processing terminal 200*t*, and it is preferable that the display device 150 of the image forming apparatus 100*t* and/or the display device 230 of the information processing terminal 200*t* be able to display the download list. On the other hand, it may not be able to be accessed from the image forming apparatuses 100*a* to 100*c* and/or the information processing terminals 200*a* to 200*c*.

In FIG. 18B, the image forming apparatus 100*t* forms the answer sheets RSa to RSc on the basis of the answer scan data RSDa to the answer scan data RSDc. In this case, the image forming apparatus 100*t* or the information processing terminal 200*t* may sort the answer scan data RSDa to the answer scan data RSDc in accordance with upload times of the answer scan data RSDa to the answer scan data RSDc. In addition, it is preferable that the display device 150 of the image forming apparatus 100*t* and/or the display device 230 of the information processing terminal 200*t* be able to display a sorted list.

Alternatively, when the image forming apparatus 100*t* downloads a plurality of pieces of answer scan data included in the answer folder a plurality of times, it is preferable the image forming apparatus 100*t* or the information processing terminal 200*t* perform display such that answer scan data which has already been downloaded and answer scan data which has not yet been downloaded can be visually recognized. For example, it is preferable that the display device 150 or the display device 230 display answer scan data in different forms depending on whether or not it has been downloaded.

In addition, even when the image forming apparatuses 100*a* to 100*c* generate the answer scan data RSDa to the answer scan data RSDc by scanning the answer sheets RSa to RSc having different sizes, it is preferable that the image forming apparatus 100*t* form the answer sheets RSa to RSc having the same size.

In addition, in FIG. 19B, the image forming apparatuses 100*a* to 100*c* form the evaluation result sheets ESa to Esc by downloading the evaluation result scan data ESDa to the evaluation result scan data ESDc. In this case, the data management apparatus 300 may create a download list indicating the image forming apparatuses 100*a* to 100*c* or the operators A to C that have downloaded the evaluation result scan data ESDa to the evaluation result scan data ESDc by checking the image forming apparatuses 100*a* to 100*c* or the operators A to C that have downloaded the evaluation result scan data ESDa to the evaluation result scan data ESDc.

The download list can be accessed from the image forming apparatus 100*t* and/or the information processing terminal 200*t*, and it is preferable that the display device 150 of the image forming apparatus 100*t* and/or the display device 230 of the information processing terminal 200*t* be able to display the download list. On the other hand, it may not be able to be accessed from the image forming apparatuses 100*a* to 100*c* and/or the information processing terminals 200*a* to 200*c*.

In the foregoing description, a constitution indicating a deadline related to print data has been mainly described as an example of the second display data, but the present embodiment is not limited to this. A constitution indicating precautions that require attention regarding handling of print data may be adopted as the second display data. The precautions that require attention regarding handling of print data may be matters that an operator should pay attention to when printed matter is scanned or uploaded after the print data is printed.

Hereinabove, the embodiment of the present invention has been described with reference to the drawings. However, the present invention is not limited to the foregoing embodiment and can be performed in various forms within a range not departing from the gist thereof. In addition, various inventions can be formed by suitably combining a plurality of constituent elements disclosed in the foregoing embodiment. For example, some constituent elements may be deleted from all of the constituent elements described in the embodiment. Moreover, constituent elements from different embodiments may be suitably combined. In order to facilitate the understanding, the drawings schematically show each of the constituent elements independently, and the thickness, the length, the number, the interval, and the like of each of the constituent elements shown in the diagrams may differ from actual values for the convenience of creation of drawings. In addition, the material, the shape, the dimensions, and the like of each of the constituent elements described in the foregoing embodiment are merely examples and are not particularly limited, and various changes can be made within a range not substantially departing from the effects of the present invention.

INDUSTRIAL APPLICABILITY

The present invention is favorably used for a data communication system and a data communication method.

The invention claimed is:

1. An image forming apparatus comprising:
  - a forming device forming an image on a sheet in accordance with print data;
  - a communication device communicating with a data management apparatus;
  - a display device provided on a housing accommodating the forming device;
  - an operation device receiving an operation of a user; and
    - a controller including a processor and causing the display device, when the processor executes a computer program:
      - to display, when receiving a selection instruction for the print data via the operation device, printing conditions related to the print data, including a number of sheets, a sheet size, and single-sided or double-sided printing, as indicated by first display data associated with the print data,
      - to display, when receiving an instruction to switch a display image via the operation device, a deadline related to the print data, as indicated by second display data associated with the print data, in place of the printing conditions indicated by the first display data, the deadline being a deadline by which the print data is printable or a deadline by which a response to the print data is requested, and
      - to download the print data from the data management apparatus via the communication device, when an instruction to execute downloading of the print data is received via the operation device.

2. The image forming apparatus according to claim 1,
  - wherein the controller causes the display device to display a button for receiving the instruction to switch a display image, and to display the deadline indicated by the second display data in place of the printing conditions indicated by the first display data, when an operation of the button is received by the operation device.

3. The image forming apparatus according to claim 1,
  - wherein, when the communication device receives printing condition limitation information related to the print data, the controller causes the forming device to form an image indicated by the print data on the sheet in accordance with the printing condition limitation information,
  - wherein the controller:
    - causes, when the printing condition limitation information indicates that the sheet size other than a particular size is limited, the forming device to form the image only on a sheet having the particular size, and
    - prohibits, when the printing condition limitation information indicates that an intensive printing, in which a plurality of pages are intensively printed onto a single sheet, is limited, the forming device from forming the image by using the intensive printing.

4. The image forming apparatus according to claim 3, wherein the printing condition limitation information is set to a folder storing the print data in the data management apparatus.

5. An image forming apparatus comprising:

a forming device forming an image on a sheet in accordance with print data;

a communication device communicating with a data management apparatus;

a display device provided on a housing accommodating the forming device;

an operation device receiving an operation of a user; and a controller including a processor and causing the display device, when the processor executes a computer program:

to display, when the communication device receives first display data associated with the print data and indicating printing conditions related to the print data and second display data associated with the print data and indicating a deadline related to the print data from the data management apparatus, a number of sheets, a sheet size, and a single-sided or double-sided printing as the printing conditions indicated by the first display data, and to display, when receiving an instruction to switch a display image via the operation device, the deadline indicated by the second display data, in place of the printing conditions indicated by the first display data, the deadline being a deadline by which the print data is printable or a deadline by which a response to the print data is requested, and to download the print data from the data management apparatus via the communication device, when an instruction to execute downloading of the print data is received via the operation device.

* * * * *